US012793861B2

(12) United States Patent
Aleshin et al.

(10) Patent No.: US 12,793,861 B2
(45) Date of Patent: Nov. 10, 2026

(54) SEGMENTED FUEL ASSEMBLY FOR USE IN A NUCLEAR REACTOR

(71) Applicant: Westinghouse Electric Company LLC, Cranberry Township, PA (US)

(72) Inventors: Yuriy Aleshin, Cayce, SC (US); William T. Cleary, Irmo, SC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 267 days.

(21) Appl. No.: 18/623,824

(22) Filed: Apr. 1, 2024

(65) Prior Publication Data

US 2025/0308715 A1 Oct. 2, 2025

(51) Int. Cl.
*G21C 3/30* (2006.01)

(52) U.S. Cl.
CPC ...................................... *G21C 3/30* (2013.01)

(58) Field of Classification Search
CPC ... G21C 3/00; G21C 3/02; G21C 3/04; G21C 3/30; G21C 3/38
See application file for complete search history.

(56) References Cited

U.S. PATENT DOCUMENTS 2,969,312 A * 1/1961 Monson ................... G21C 3/04 376/424
4,060,454 A * 11/1977 Miertschin ............... G21C 3/28 376/427
4,134,791 A 1/1979 Delafosse
4,716,015 A * 12/1987 Carlson .................... G21C 3/32 376/454
5,009,837 A * 4/1991 Nguyen ................. G21C 3/326 376/451
6,665,366 B2 * 12/2003 Aujollet ................... G21C 3/64 376/427
2020/0234834 A1 * 7/2020 Shargots .................. G21C 3/32
2020/0365290 A1 11/2020 Fisher et al.
2020/0373027 A1 11/2020 Gramlich et al.
2021/0202122 A1 * 7/2021 Inman ...................... G21C 3/34
2021/0375495 A1 * 12/2021 Shargots ................ B64G 1/402
2022/0068512 A1 * 3/2022 Russell, II ............... G21C 3/38

FOREIGN PATENT DOCUMENTS

SE 432679 B 4/1984
WO 2022271433 A2 12/2022

OTHER PUBLICATIONS

International Search Report and Written Opinion for corresponding International Application No. PCT/US2025/022414 mailed on Sep. 1, 2025.

* cited by examiner

*Primary Examiner* — Sharon M Davis
(74) *Attorney, Agent, or Firm* — K&L Gates LLP

(57) ABSTRACT

A segmented fuel assembly for use in a nuclear reactor is disclosed. The segmented fuel assembly comprises a lower nozzle, an upper nozzle, a plurality of guide tubes positioned intermediate the lower nozzle and the upper nozzle, and a plurality of fuel segments positioned intermediate the upper nozzle and the lower nozzle. The plurality of guide tubes are arranged in a first array. Each guide tube defines a longitudinal axis. Each fuel segment comprises a body defining a plurality of coolant flow channels and a plurality of guide tube openings. The guide tube openings are arranged in a second array corresponding to the first array. The guide tubes are positioned in the guide tube openings.

21 Claims, 21 Drawing Sheets

SEGMENTED FUEL ASSEMBLY FOR USE IN A NUCLEAR REACTOR

FIELD

The present disclosure is generally related to nuclear power and, more particularly, is directed toward a segmented fuel assembly for use in a nuclear reactor.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a segmented fuel assembly for use in a nuclear reactor is disclosed. In at least one aspect, the segmented fuel assembly comprises a lower nozzle, an upper nozzle, a plurality of guide tubes positioned intermediate the lower nozzle and the upper nozzle, and a plurality of fuel segments positioned intermediate the upper nozzle and the lower nozzle. The plurality of guide tubes are arranged in a first array. Each guide tube defines a longitudinal axis. Each fuel segment comprises a body defining a plurality of coolant flow channels and a plurality of guide tube openings. The guide tube openings are arranged in a second array corresponding to the first array. The guide tubes are positioned in the guide tube openings.

In at least one aspect, the body comprises an enclosure and fission material encapsulated within the enclosure. In at least one aspect, the body is 3D printed. In at least one aspect, the plurality of fuel segments are arranged in a stacked configuration intermediate the lower nozzle and the upper nozzle. In at least one aspect, the plurality of fuel segments comprise a first fuel segment and a second fuel segment. The first fuel segment comprises a protrusion and the second fuel segment comprises an opening to receive the protrusion. The protrusion and opening are configured to interlock the first fuel segment and the second fuel segment. In at least one aspect, the coolant flow channels are defined in a third array, and the second array of the guide tube openings is disposed within the third array of the coolant flow channels. In at least one aspect, the body further comprises a plurality of fins extending laterally into the coolant flow channels. In at least one aspect, the plurality of coolant flow channels comprise first coolant flow channels extend longitudinally, each fuel segment further comprises a plurality of second coolant flow channels defined by the body, and the second coolant flow channels extending laterally. In at least one aspect, a first guide tube opening of the plurality of guide tube openings comprises an annular bulge slot defined by the body of at least one of the fuel segments. In at least one aspect, a portion of a first guide tube of the plurality of guide tubes is deformed into the annular bulge slot to interlock the at least one of the fuel segment to the first guide tube.

In various aspects, a fuel segment for a fuel assembly comprising an upper nozzle, a lower nozzle, and a plurality of guide tubes intermediate the upper nozzle and the lower nozzle is disclosed. In at least one aspect, the fuel segment comprises a body comprising an enclosure and a fission material encapsulated within the enclosure. The body defines a plurality of coolant flow channels and a plurality of guide tube openings. The guide tube openings are to receive the guide tubes of the fuel assembly. In at least one aspect, the body is 3D printed.

In at least one aspect, the guide tubes of the fuel assembly define a first array, and the guide tube openings of the fuel segment define a second array that corresponds to the first array. In at least one aspect, the coolant flow channels defined in a third array, and the second array of the guide tube openings is disposed within the third array of the coolant flow channels. In at least one aspect, the body further defines a plurality of fins extending into the coolant flow channels. In at least one aspect, the plurality of coolant flow channels comprise first coolant flow channels extend longitudinally, the fuel segment further comprises a plurality of second coolant flow channels defined by the body, and the second coolant flow channels extending laterally. In at least one aspect, a first guide tube opening of the plurality of guide tube openings comprises an annular bulge slot defined by the body. In at least one aspect, a portion of a first guide tube of the plurality of guide tubes is deformed into the annular bulge slot to interlock the fuel segment to the first guide tube. In at least one aspect, the body further defines an integral insert positioned within at least one of the plurality of coolant flow channels. In at least one aspect, the integral insert is a cross.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the disclosure, in one form, and such exemplifications are not to be construed as limiting the scope of the disclosure in any manner.

DETAILED DESCRIPTION

Figure 1:
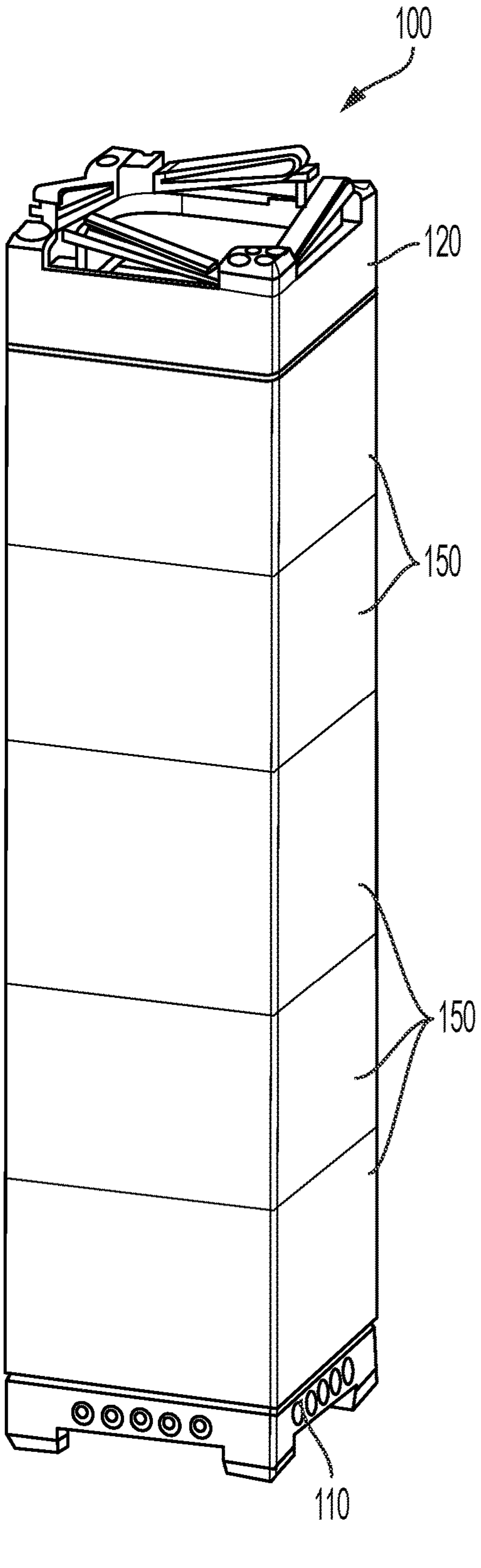
FIG. 1 is a perspective view of a segmented fuel assembly for use in a nuclear reactor, according to an aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the segmented fuel assembly in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

In general, existing nuclear fuel assemblies typically consist of twelve to fourteen foot long fuel rods contained by top and bottom nozzles and supported by various types of spacer grids. Past and current fuel assembly configurations were limited by existing manufacturing methods proven in other industries. With the evolution of additive manufacturing (AM) technologies these limitations are being made obsolete. The development of AM systems for use in nuclear reactors, specifically fuel assemblies, potentially allows the creation of new geometries and structures that were previously unavailable. These geometries could be optimized to improve fuel management, operating conditions, reduce or eliminate performance issues (fretting, debris, or pellet cladding interaction [PCI]) and address licensing concerns (Fuel Fragmentation, Relocation, and Dispersal [FFRD] and Zircaloy-steam reactions in accident conditions and beyond design basis accident performance).

One solution to the above mentioned issues with existing fuel assembly designs is a segmented fuel assembly utilizing short (e.g., up to one foot) interfacing segments consisting of fission material and enclosure encapsulating the fission material. In various aspects, these fuel segments are additively manufactured allowing each segment to be built independently of the others. The segmented fuel design supports higher burnup, longer life cycle, and better fuel utilization as compared to existing fuel assembly designs. As such, the segmented fuel should not experience the current fuel performance issues (debris, grid to rod fretting [GTRF] and, pellet-cladding mechanical interaction [PCMI] failures). The selection of the segmented fuel enclosure and fission material may eliminate the current licensing concerns related to FFRD and eliminate a possibility of Zircaloy-steam reaction.

The use of additively manufactured fuel assemblies permit the fuel to be placed in different geometries that are more favorable than current existing fuel geometries thus allowing an additional avenue for optimized fuel utilization as well as the potential for better accident tolerance. The segmented fuel assemblies described herein are designed to be used in existing Light-water reactor (LWR) nuclear power plants (NPPs) as well as new LWR NPPs (e.g., AP1000, AP300, SMR, etc.) and generation IV NPPs with flowing media as a coolant (e.g., lead, sodium, helium, etc.). To enable these applications, in various aspects, the segmented fuel assemblies described herein utilize the conventional skeleton having top and bottom nozzles connected by the required number of guide thimbles, instrument tube, and corresponding joint connections. The fit and form of the skeleton corresponds to the selected fuel type to be replaced. The stack of fuel segments consists of a number of interfacing segments positioning by the guide thimbles and interfacing features. In at least one aspect, the top and bottom fuel segments of the stack interface with the upper nozzle and the lower nozzle respectively.

As described in greater detail below, a fuel segmented (e.g., power block) may consist of an enclosure and fission material surrounded by the enclosure. The enclosure is a thin wall structure which provides a barrier between the fission material and the reactor coolant. Depending on fuel management and operating conditions, as well as required performance benefits, the enclosure material and thickness could be selected from several different alloys. For example, a Zirconium (Zr) based material and/or FeCrAl could be used for the enclosure.

Further to the above, the fission material composition could also vary depending on desirable performance. All known fuel assembly compositions could be used including UO2, UO2 in Zr matrix, UxSiy, UxSiy in Zr matrix, UxNy, UxNy in Zr matrix, U-xMo, U-xMo-yZr, U-xNb-yZr, U-xZr, etc.

Figure 2:
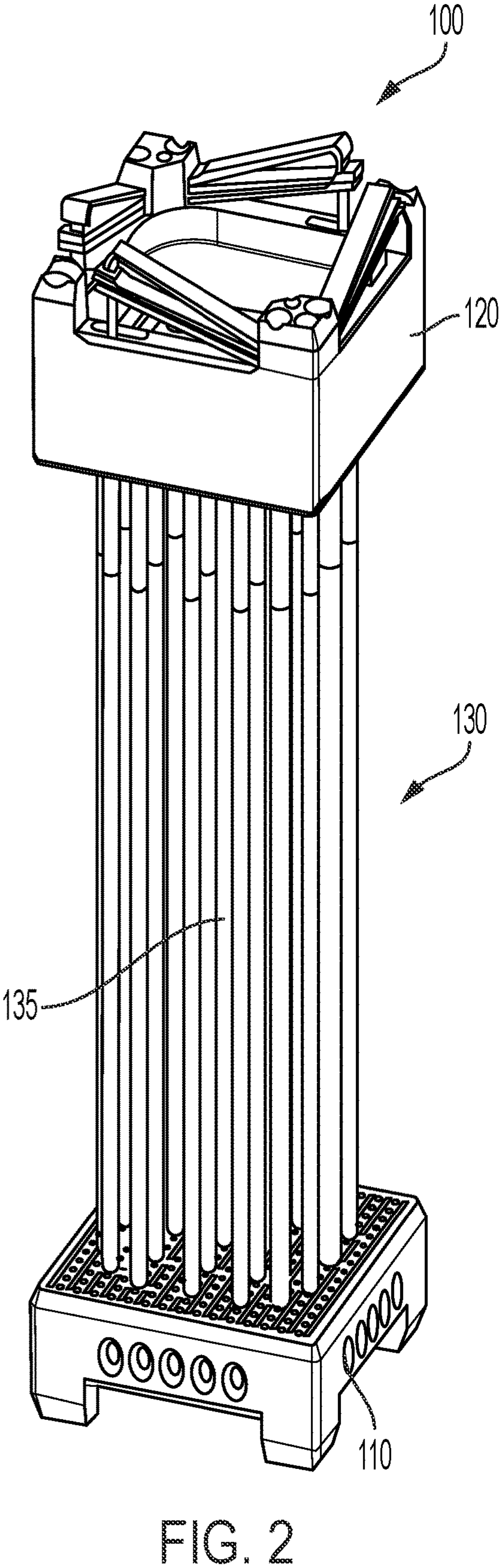
FIG. 2 is a perspective view of the segmented fuel assembly of FIG. 1 with fuel segments of the segmented fuel assembly hidden to illustrate a plurality of guide tubes and an instrumentation tube, according to an aspect of the present disclosure.

FIGS. 1 and 2 illustrate a segmented fuel assembly 100 for use in a nuclear reactor, according to an aspect of the present disclosure. The segmented fuel assembly 100 comprises a lower nozzle 110 (e.g., a bottom nozzle), an upper nozzle 120 (e.g., a top nozzle), a plurality of guide tubes 130 positioned intermediate the lower nozzle 110 and the upper nozzle 120, an instrumentation tube 135 positioned intermediate the lower nozzle 110 and the upper nozzle 120, and a plurality of fuel segments 150 positioned intermediate the lower nozzle 110 and the upper nozzle 120. In at least one aspect, one or more than one of the fuel segments 150 may be greater than or equal to three inches in height and less than or equal to thirty six inches in height. In at least one aspect, one or more than one of the fuel segments 150 may be twelve inches in height. In at least one aspect, one or more than one of the fuel segments 150 may be different heights.

Further to the above, FIG. 2 illustrates the segmented fuel assembly 100 of FIG. 1 with the fuel segments 150 hidden to illustrate the plurality of guide tubes 130, according to an aspect of the present disclosure. In at least one aspect, the fuel assembly 100 comprises twenty four guide tubes 130 and one instrumentation tube 135 for a total of twenty five tubes. In any event, the guide tubes 130 and/or instrumentation tube 135 are to receive portions of a core component assembly therein which may act as a moderator and/or may comprise target materials to be irradiated. For example, the core component assembly may comprise control rods having poison material, for example. In at least one aspect, the plurality of guide tubes 130 and the instrumentation tube 135 are arranged in a first array and extend from the lower nozzle 110. Each guide tube 130, 135 defines a longitudinal axis extending from the lower nozzle 110 toward the upper nozzle 120. The plurality of guide tubes 130, 135 are to be received within a plurality of tube openings 154 (see FIG. 4) defined within the fuel segments 150, as discussed in greater detail below.

Figure 3:
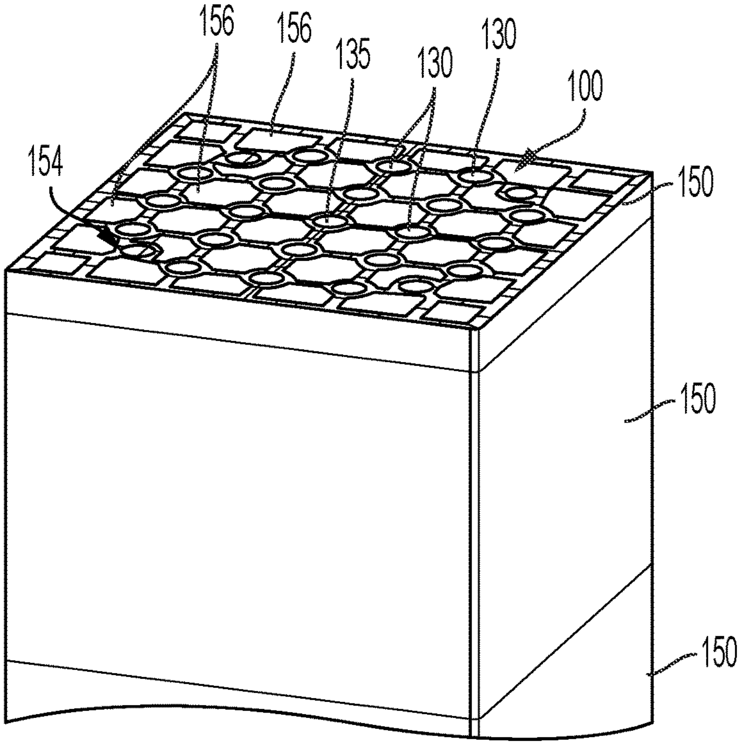
FIG. 3 is cross-section perspective view of the fuel assembly of FIG. 1, according to an aspect of the present disclosure.
Figure 4:
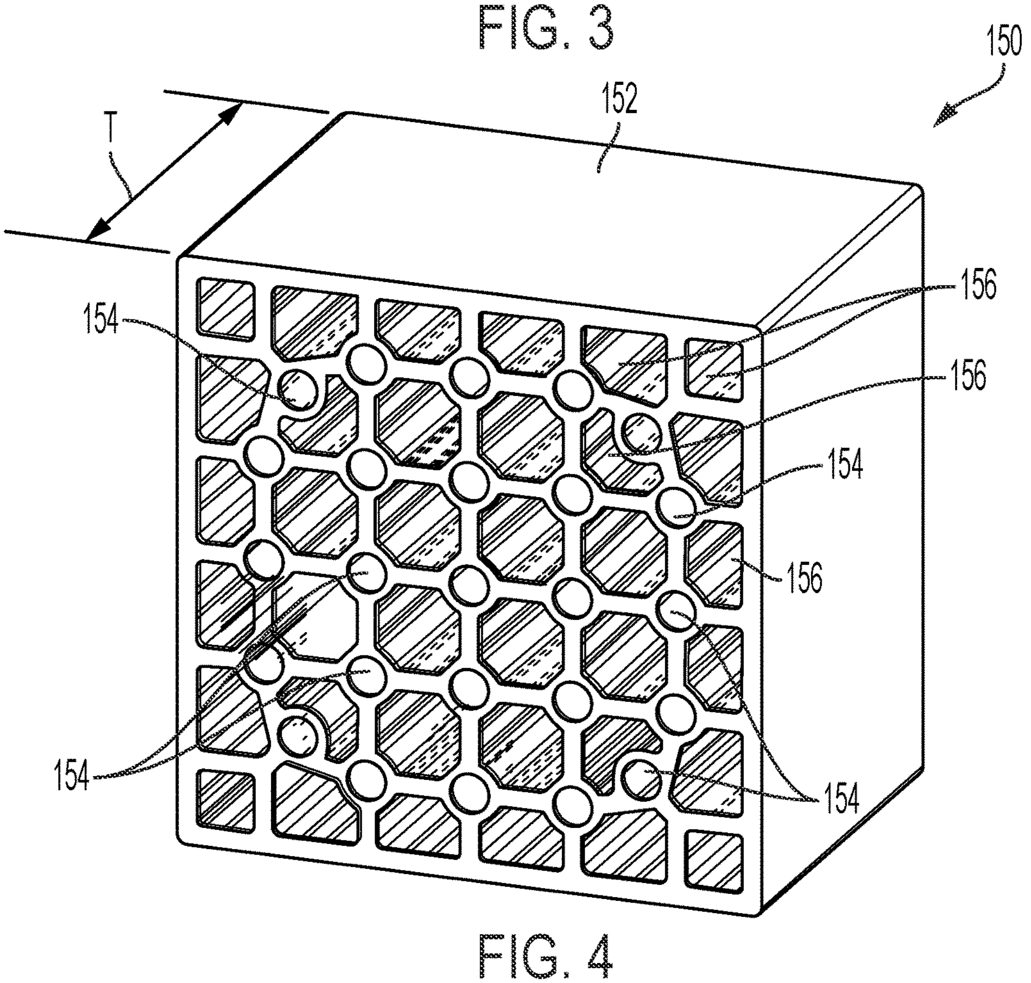
FIG. 4 is a perspective view of one of the fuel segments of the fuel assembly of FIG. 1, according to an aspect of the present disclosure.

FIG. 3 is a cross section view taken laterally through one of the fuel segments 150 of the segmented fuel assembly 100 of FIG. 1, according to an aspect of the present disclosure. As shown in FIG. 3, the plurality of guide tubes 130 and the instrumentation tube 135 extend through the plurality of tube openings 154 of the fuel segment 150. As shown in FIGS. 3 and 4, there are twenty-five of the guide tubes 130, 135 and there are twenty-five of the tube openings 154. It should be understood, however, that any number and/or any array of tube openings 154 may be utilized to accommodate any number and/or any array of the plurality of guide tubes 130, 135. In various aspects, the tube openings 154 are arranged in a second array that corresponds to the first array of the guide tubes 130 and the instrumentation tube 135 so that the plurality of guide tubes 130,135 may be received in the tube openings 154.

Figure 5:
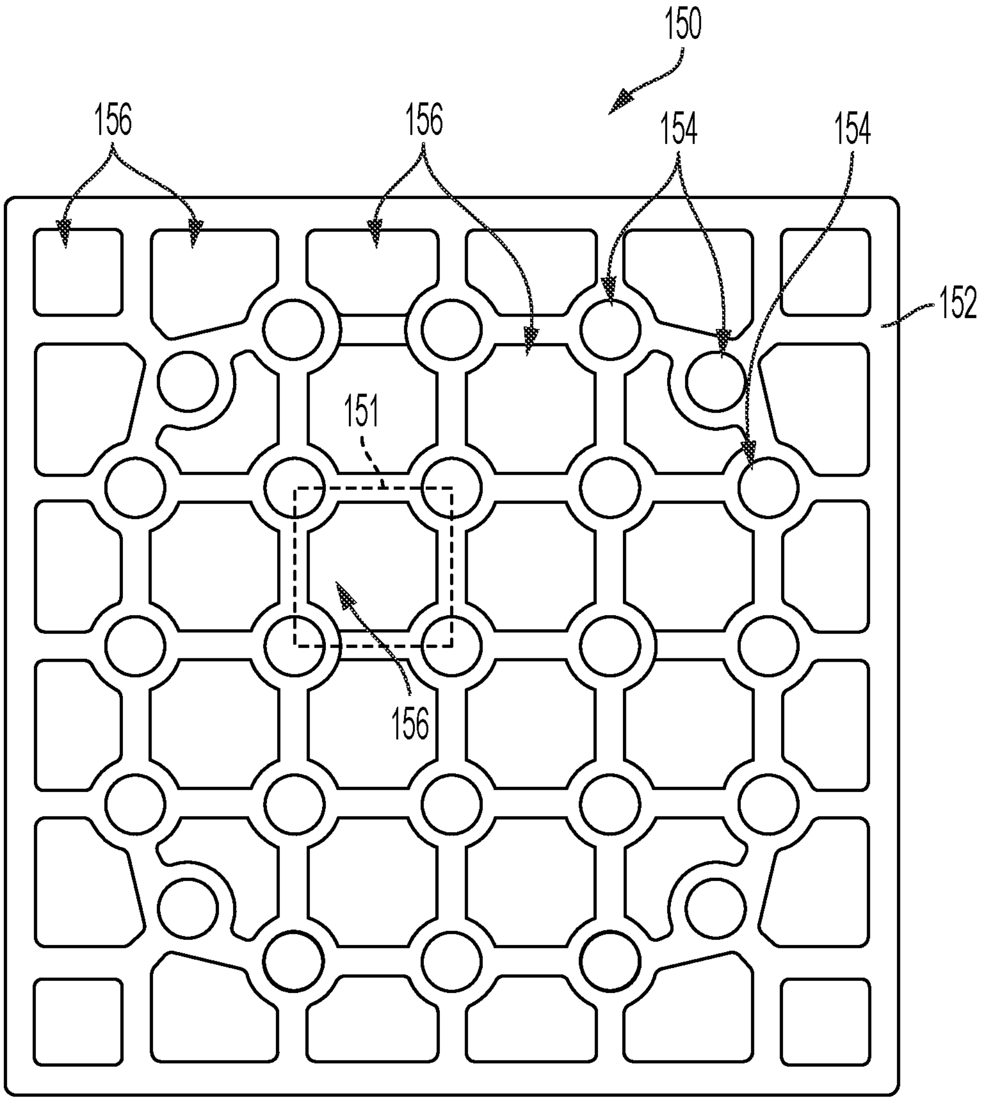
FIG. 5 is a plan view of the fuel segment of FIG. 4, according to an aspect of the present disclosure.

Referring primarily to FIGS. 4 and 5, the fuel segment 150 comprises a body 152 defining the plurality of tube openings 154 and a plurality of coolant flow channels 156, according to an aspect of the present disclosure. As shown in FIG. 4, the coolant flow channels 156 are positioned around the outside and in between the plurality of tube openings 154. The plurality of flow channels 156 is arranged in a third array (e.g., pattern) and is configured to permit reactor coolant to flow therethrough when the fuel segment 150 is in operation. In at least one aspect, the plurality of tube openings 154 is disposed within the third array of the plurality of flow channels 156. Further, the plurality of tube openings 154 and the plurality of flow channels 156 extend through the entire thickness T (see FIG. 4) of the body 152 of the fuel segment 150.

During assembly of the segmented fuel assembly 100, the fuel segments 150 are installed onto the guide tubes 130 from the upper nozzle 120 side. Specifically, when the upper nozzle 120 is not present, the fuel segments 150 can be installed onto the plurality of guide tubes 130 one at a time to form the stacked configuration illustrated in FIG. 1. Specifically, the first of the fuel segments 150 installed onto the guide tubes 130 abut the lower nozzle 110. The next fuel segment 150 will be stacked onto the first segment abutting the lower nozzle 110, for example, and so on until the desired number of the fuel segments 150 are stacked. In any event, the above described relationship between the tube openings 154 of the fuel segment 150 and the plurality guide tubes 130, 135 align the fuel segments 150 with one another laterally. Moreover, when several of the fuel segments 150 are stacked onto one another, the flow channels 156 of each fuel segment 150 are aligned with one another and therefore permit reactor coolant to flow between the segments 150 of the plurality of fuel segments 150.

Further to the above, FIG. 1 illustrates five of the fuel segments 150, however, it should be understood that any number of the fuel segments 150 may be installed between the lower nozzle 110 and the upper nozzle 120. In at least one aspect, fourteen of the fuel segments 150 are positioned between the lower nozzle 110 and the upper nozzle 120. Moreover, different types of fuel segments other than the fuel segments 150 may be installed between the lower nozzle 110 and the upper nozzle 120. In such instances, these fuel segments may comprise the array (e.g., pattern) of the tube openings 154 therein in order for the fuel segments to be received onto the plurality of guide tubes 130, 135 with the corresponding array. Different configurations of fuel segments are described in greater detail herein.

Figure 6:
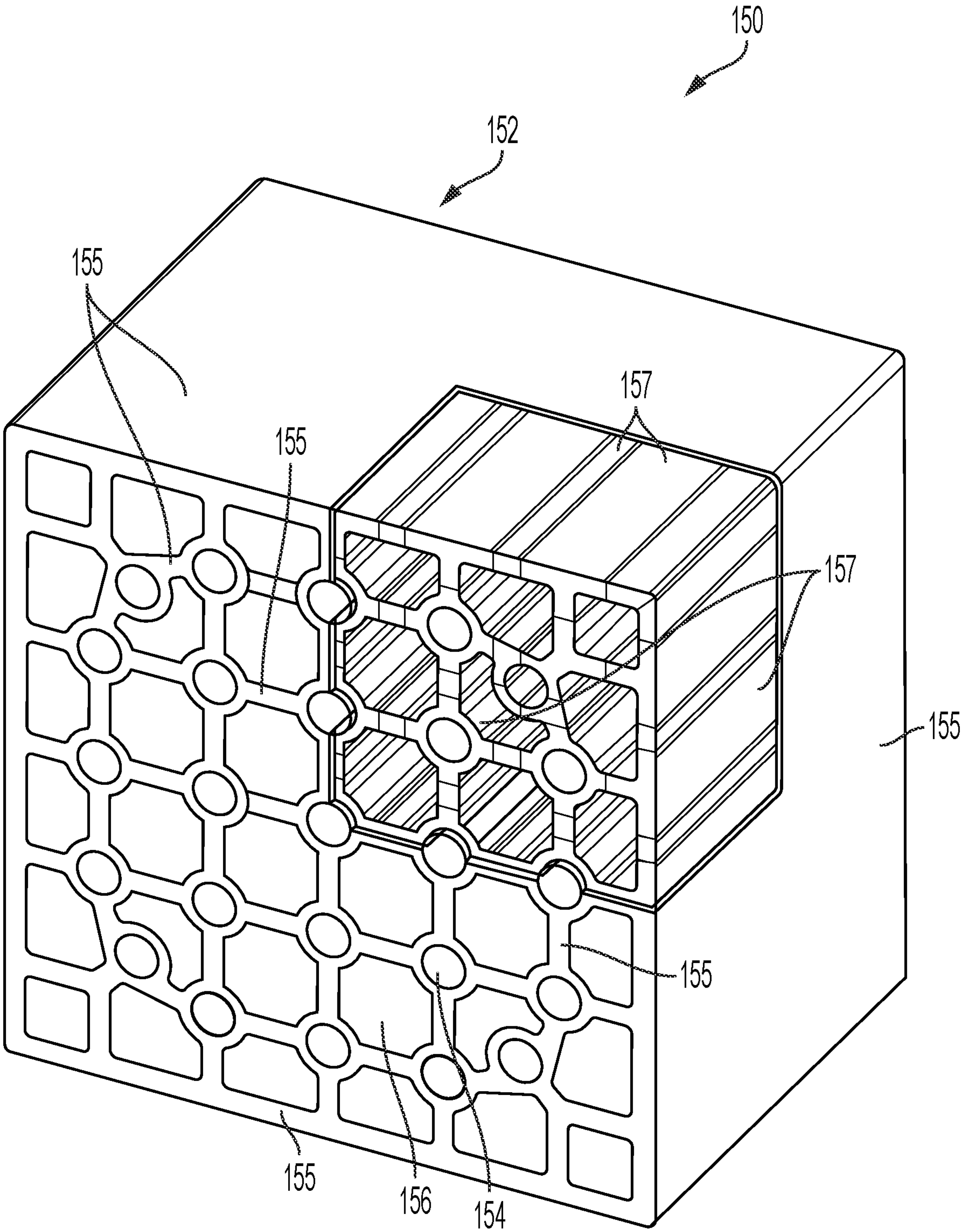
FIG. 6 is a perspective view of the fuel segment of FIG. 4, illustrating a portion of an enclosure of the fuel segment removed to show fission material encapsulated within the enclosure, according to an aspect of the present disclosure.

Referring to FIG. 6, the body 152 of the fuel segment 150 comprises an enclosure 155 and fission material 157 encapsulated (e.g., housed) within the enclosure 155, according to an aspect of the present disclosure. Specifically, FIG. 6 illustrates a portion of the enclosure 155 of the fuel segment 150 removed to show the fission material 157 that is encapsulated within the enclosure 155. In various aspects, the fuel segment 150 is 3D printed (e.g., additive manufacturing) as a one piece, unitary structure, as discussed in greater detail below.

Figure 7:
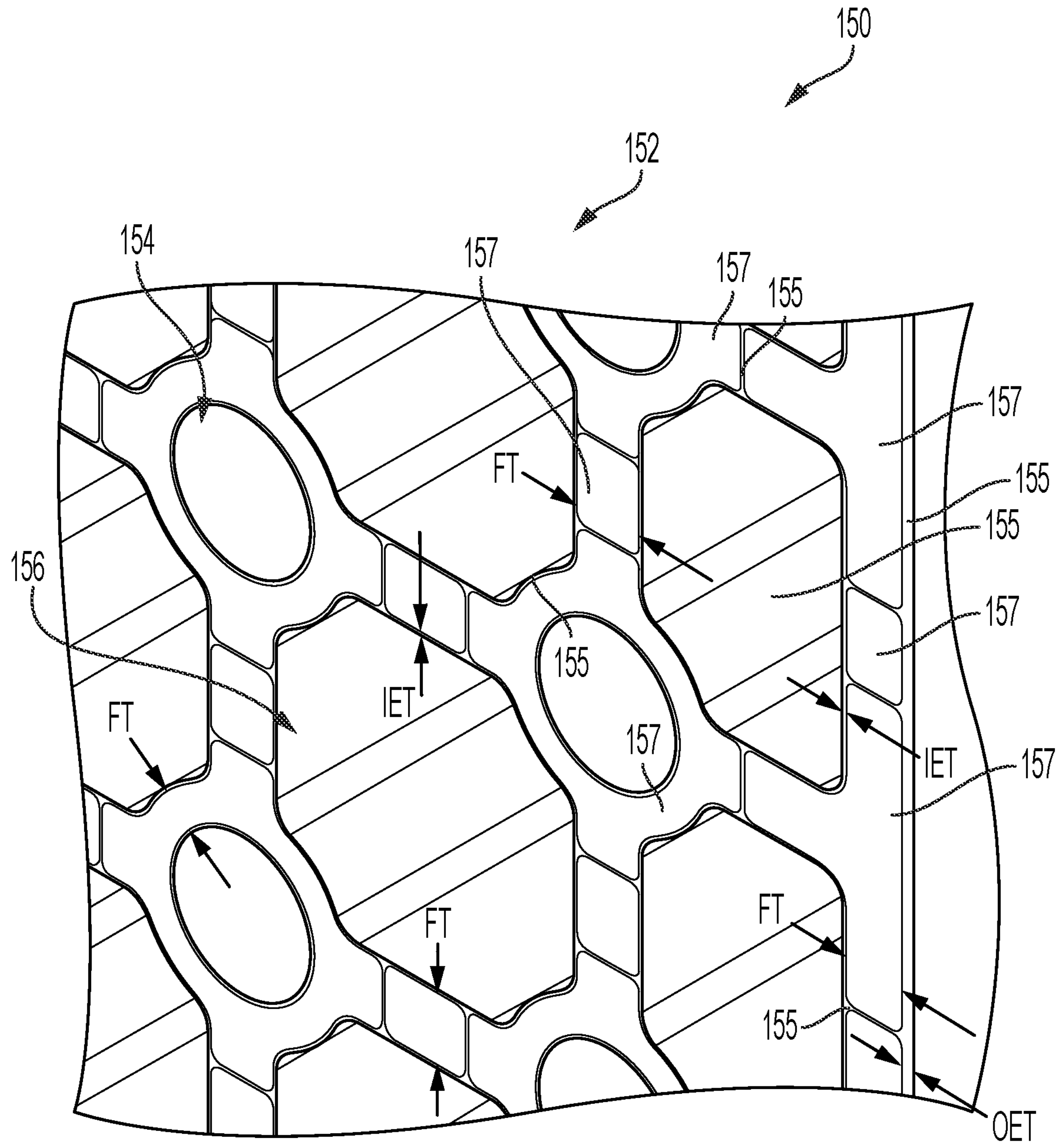
FIG. 7 is an enlarged cross section view of the fuel segment of FIG. 4, illustrating the fission material within the enclosure, according to an aspect of the present disclosure.

FIG. 7 is an enlarged cross section view taken laterally though the fuel segment 150, according to an aspect of the present disclosure. FIG. 7 illustrates different lateral sections (e.g., shapes) of the fission material 157 encapsulated within the enclosure 155. As shown in FIG. 7, the fission material 157 is defined in different sections, however each section of fission material 157 is completely encapsulated by the enclosure 155. In at least one aspect, the thickness of the enclosure 155 varies depending on the location. Specifically, in at least one aspect, the enclosure 155 defines an inner enclosure thickness IET and the enclosure 155 defines an outer enclosure thickness OET, see FIG. 7 In at least one aspect, the outer enclosure thickness OET is present along the four outer walls of the fuel segment 150 and is greater than the inner enclosure thickness IET.

Figure 8:
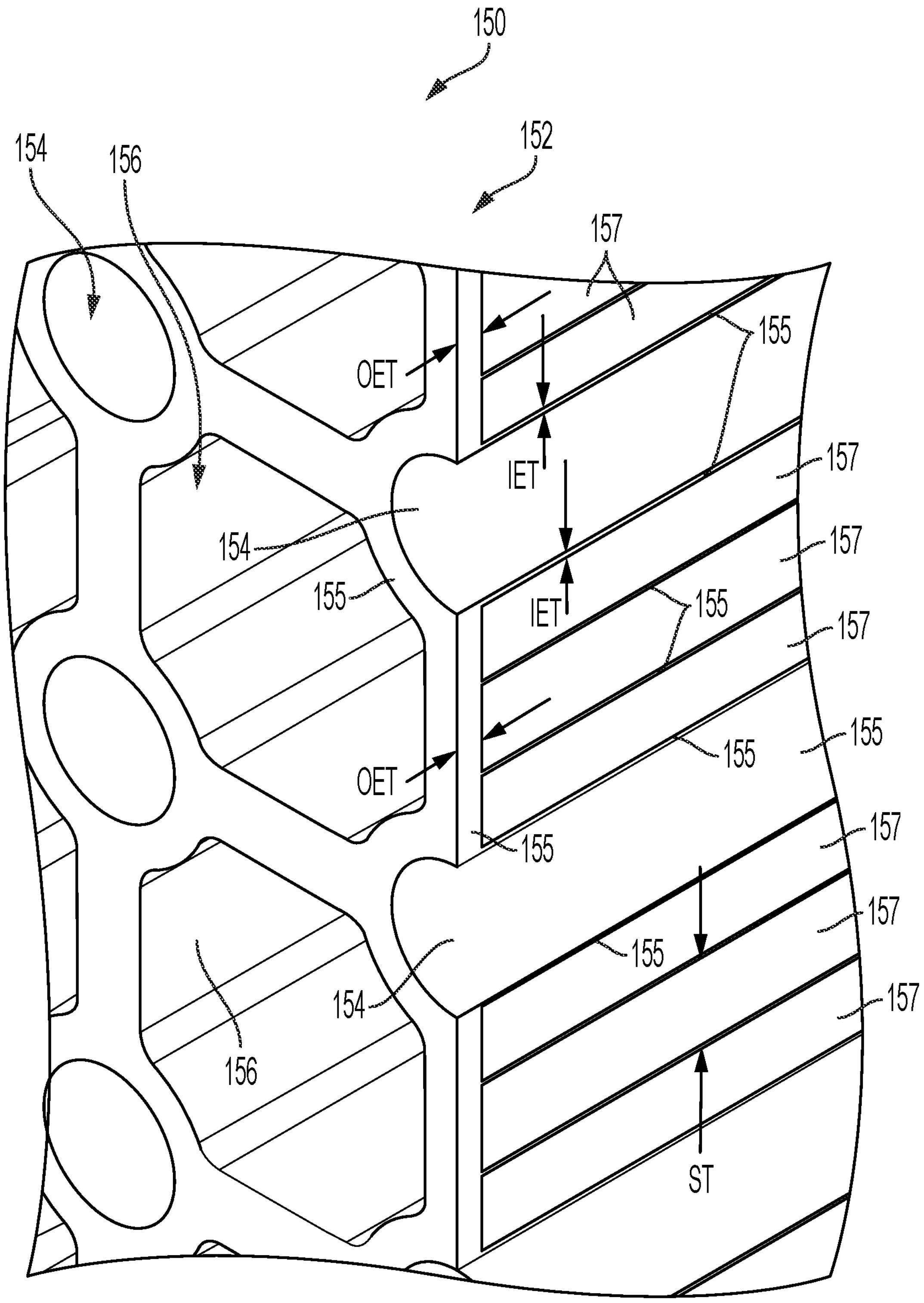
FIG. 8 is another enlarged cross section view of the fuel segment of FIG. 4, illustrating the fission material within the enclosure, according to an aspect of the present disclosure.
Figure 9:
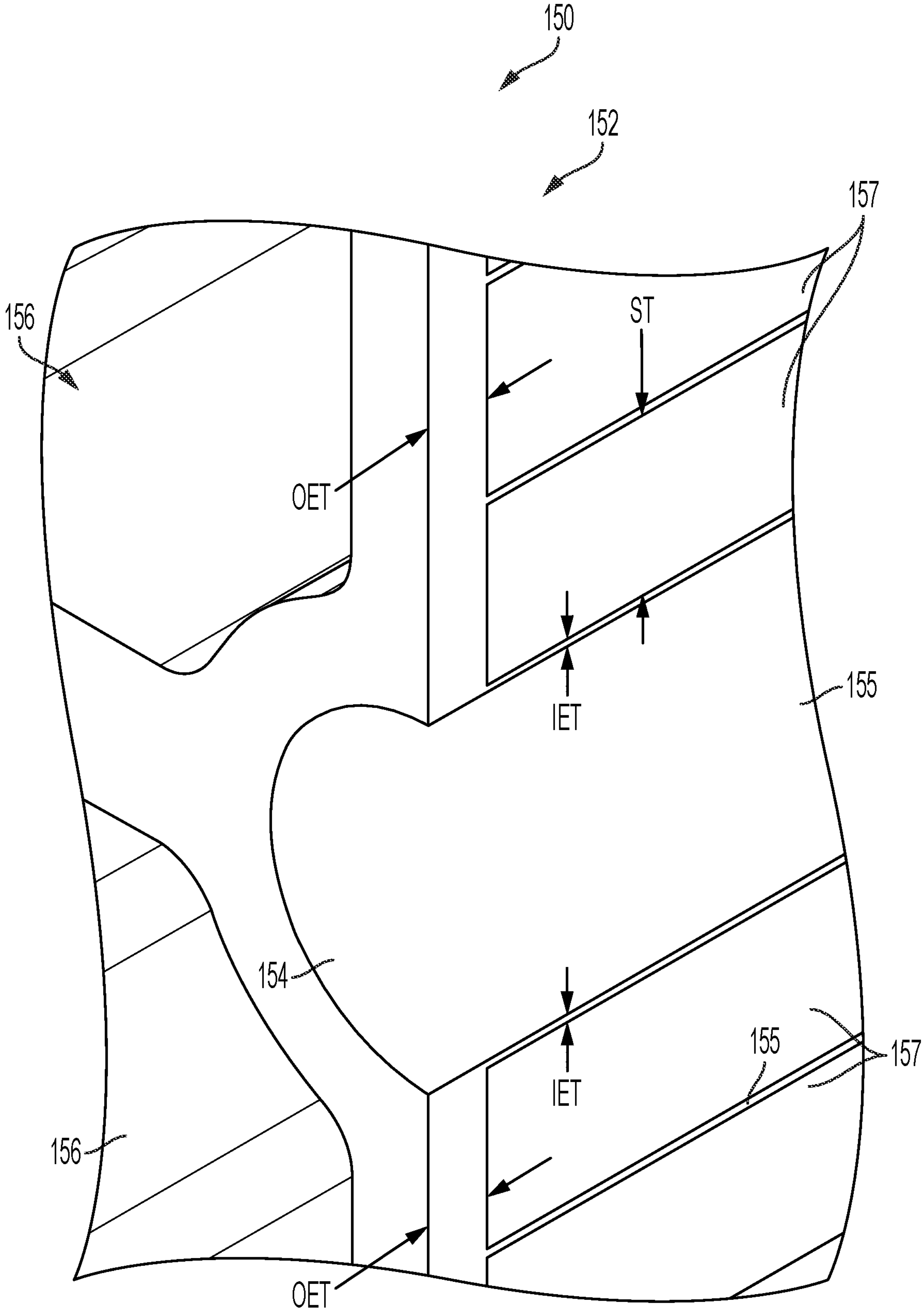
FIG. 9 is an enlarged view taken from FIG. 8, according to an aspect of the present disclosure.

Turning now to FIGS. 8 and 9. FIG. 8 is an enlarged cross section view taken longitudinally down the length of the fuel segment 150, according to an aspect of the present disclosure. FIG. 9 is an enlarged view of FIG. 8. FIGS. 8 and 9 illustrate the different longitudinal sections (e.g., shapes) of the fission material 157 encapsulated within the enclosure 155. As shown in FIGS. 8 and 9, the fission material 157 is defined in different longitudinal sections, however each section of fission material 157 is completely encapsulated by the enclosure 155. Moreover, the thickness of the enclosure 155 varies depending on the location. Specifically, FIGS. 8 and 9 illustrate the inner enclosure thicknesses IET and the outer enclosure thicknesses OET discussed above. The enclosure 155 portions defining the inner enclosure thickness IET extend longitudinally down the length of the fuel segment 150 as shown in FIGS. 8 and 9. Further, the outer enclosure thickness OET is present at the top and bottom ends of the fuel segment 150 and is also present along the four outer walls of the fuel segment 150. In other words, in at least one aspect, the outer enclosure thickness is defined on all six faces of the fuel segment 150. In at least one aspect, the inner enclosure thickness IET and the outer enclosure thickness OET are the same.

Further to the above, in at least one aspect, the IET is greater than or equal to 0.010 inch and less than or equal to 0.030 inch. In at least one aspect, the inner enclosure thickness IET is 0.012 inch. Further, in at least one aspect, the outer enclosure thickness OET is greater than or equal to 0.010 inch and less than or equal to 0.100 inch. In at least one aspect, the outer enclosure thickness is 0.024 inch.

Further to the above, the fission material 157 comprises a first cross section thickness FT (see FIG. 7). In at least one aspect, the first cross section thickness FT is greater than or equal to 0.10 inch and less than or equal to 0.50 inch. In at least one aspect, the first cross section thickness FT is 0.20 inch. Further, the fission material 157 comprises a second cross section thickness ST (see FIG. 8). In at least one aspect, the second cross section thickness ST is greater than or equal to 0.10 inch and less than or equal to 0.50 inch. In at least one aspect, the second cross section thickness ST is 0.20 inch. In at least one aspect, the first cross section thickness FT and the second cross section thickness ST of the fission material 157 is less than 0.30 inch which is less than current $U0_2$ fuel pellet diameter. In general, reducing the cross section thickness of the fission material 157 will reduce the temperature gradient in the fuel (e.g., at the same heat generation rate) which may result in better in service cooling of the fission material 157.

Further to the above, in at least one aspect, the enclosure 155 is made of a material other than Zirconium or Zircalloy to avoid a Zr-steam reactions and, thus, making the fuel more accident tolerant. In at least one aspect the enclosure 155 comprises FeCrAl. In at least one aspect, the enclosure 155 comprises one of Stainless steel, Ferritic-Martensitic steel, Chromium-Molybdenum steel, Magnesium-Aluminum alloy or other specialized steel or alloy (for example, oxide-dispersion-strengthened steel) and combinations thereof.

Further to the above, in at least one aspect, the plurality of guide tubes 130 and/or the instrumentation tube 135 comprise FeCrAl. In at least one aspect the enclosure 155, the plurality of guide tubes 130, and/or the instrumentation tube 135 comprise the same material to prevent relative movement between these components in service due to swelling. In other words, when these components are made of the same material they will grow, e.g., expand together in service.

As discussed above, the fuel segment 150 may be 3D printed using additive manufacturing. In at least one aspect, the fission material 157 and the enclosure 155 are printed such that there is no space between them (e.g., the two materials are metal to metal). In various aspects, voids and/or porosity are built into the fission material 157 during the additive manufacturing processes to mitigate expected swelling of the fission material 157 in service. In at least one aspect, during additive manufacturing of the fuel segment, the AM machine may build voids and/or porosity into the fission material 157 portions by not placing fission material 157 in certain regions (e.g., by skipping a layer) within one or more layers of the fission material 157.

Further to the above, when the enclosure 155 of the fuel segment 150 is manufactured using AM processes, the fission material 157 may be AM manufactured at the same time as the enclosure 155. However, in at least one aspect, only the enclosure 155 may be AM and then fission material placed into the hollow enclosure 155 in granular or block form and then melted down to a homogeneous structure. In such instances, the enclosure 155 is printed without one of the top or bottom end plates to allow access to the inside of the enclosure 155. Once the enclosure is printed, the fission material can be placed into the hollow enclosure and melted to evenly distribute the fission material. Once the fission material is solid, the missing top or bottom plate can be 3D printed to fully encapsulate the fission material. Porosity and/or voids could be introduced in the fission material to mitigate expected swelling. In at least one aspect, porosity and/or voids could be introduced in the fission material to mitigate expected swelling before melting and then removed before the fission material solidifies completely.

Further to the above, in various aspects, the porosity and/or voids distributed within the fission material 157 can be up to 40% of the total volume of fission material 157 to provide room for fission gas release and/or to compensate for swelling.

Referring again to FIG. 1, in at least one aspect, the top fuel segment 150 and the upper nozzle 120 and/or the bottom fuel segment 150 and the lower nozzle 110 may be made as one piece, unitary structures using additive manufacturing. In at least one aspect, the segment adjacent the upper nozzle 120 and/or the segment adjacent the lower nozzle 110 may not contain fission material. In various aspects, non-fission segments, e.g. blanket segments, are utilized adjacent to the upper nozzle 120 and/or the lower nozzle 110 with fuel segments, such as the fuel segment 150, positioned in between the blanket segments. In at least one aspect, the blanket segments adjacent the upper nozzle 120 and/or the lower nozzle 110 may be additive manufacture as a one piece, unitary, structure.

Figure 10:
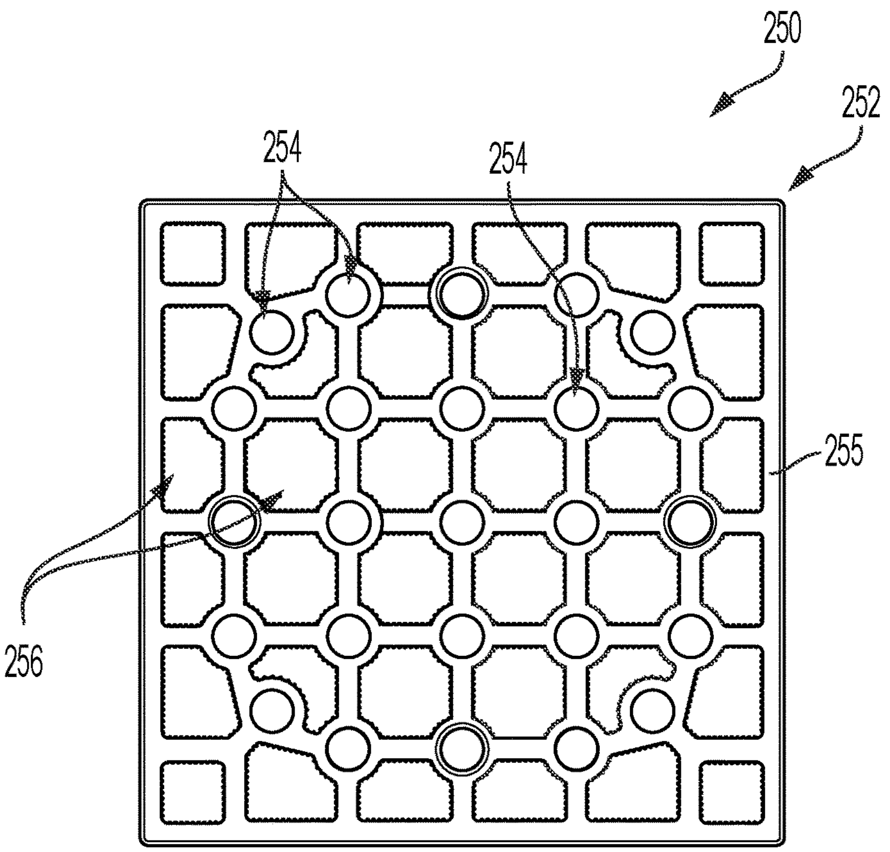
FIG. 10 is a plan view of a fuel segment, according to an aspect of the present disclosure.
Figure 11:
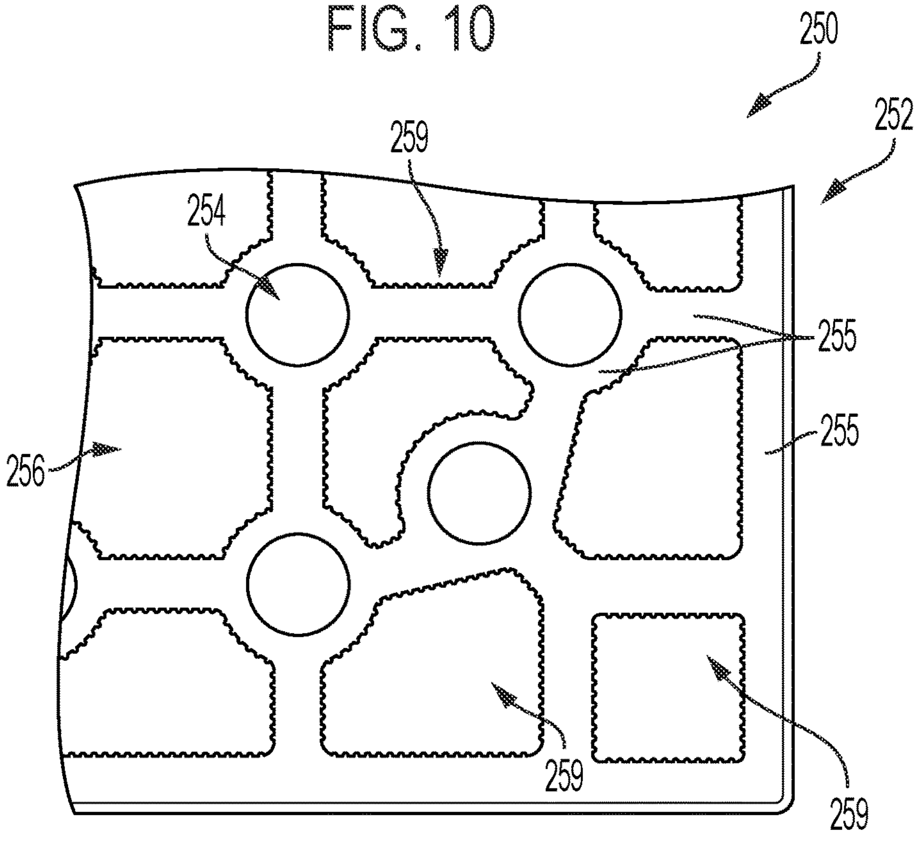
FIG. 11 is an enlarged view of the fuel segment of FIG. 10, according to an aspect of the present disclosure.

FIGS. 10 and 11 illustrate a fuel segment 250 that is similar to the fuel segment 150, except for the differences described herein, according to an aspect of the present disclosure. The fuel segment 250 comprises a body 252 defining a plurality of tube openings 254 and a plurality of coolant flow channels 256. The body 252 comprise an enclosure 255 that encapsulates fission material, similar to the body 152 discussed above. Further, the body 252 further comprises a plurality of fins 259 (e.g., teeth) extending into the coolant flow channels 256. The plurality of fins 259 increase the surface area of the enclosure 255 as compared to a fuel segment without the plurality of fins 259. In various aspects, increasing the surface area of the enclosure 255 in the coolant flow channels 256 may provide a performance benefit in service.

Figure 12:
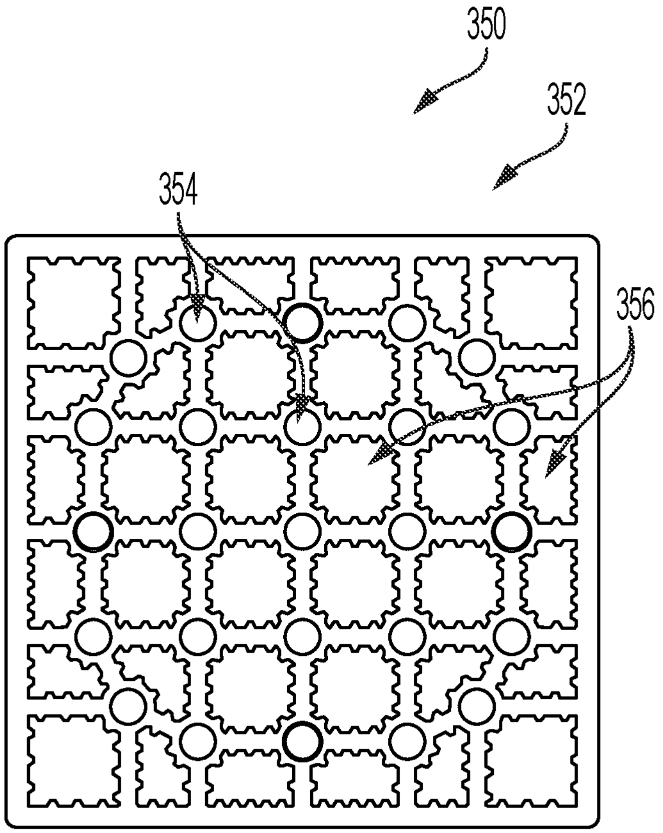
FIG. 12 is a plan view of a fuel segment, according to an aspect of the present disclosure.
Figure 13:
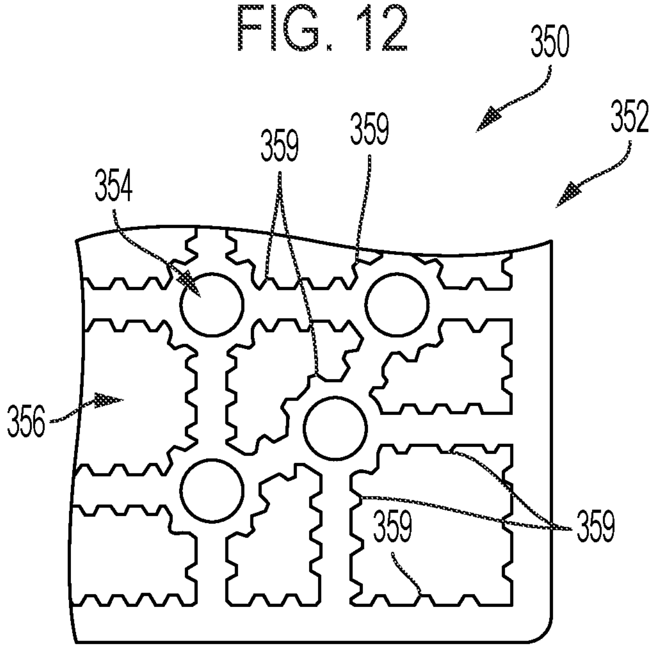
FIG. 13 is an enlarged view of the fuel segment of FIG. 12, according to an aspect of the present disclosure.

FIGS. 12 and 13 illustrate a fuel segment 350 that is similar to the fuel segments 150, 250 except for the differences described herein, according to an aspect of the present disclosure. The fuel segment 350 comprises a body 352 defining a plurality of tube openings 354 and a plurality of coolant flow channels 356. The body 352 comprises an enclosure 355 that encapsulates fission material, similar to the body 152 and the body 252 discussed above. Further, the body 352 comprises a plurality of fins 359 (e.g., teeth) extending into the coolant flow channels 356. In general, the fins 359 are larger than the fins 259 illustrated in FIG. 12. As such, the plurality of fins 359 further may increase the surface area of the enclosure 355 as compared to the fuel segment 250 having the plurality of fins 259.

Figure 14:
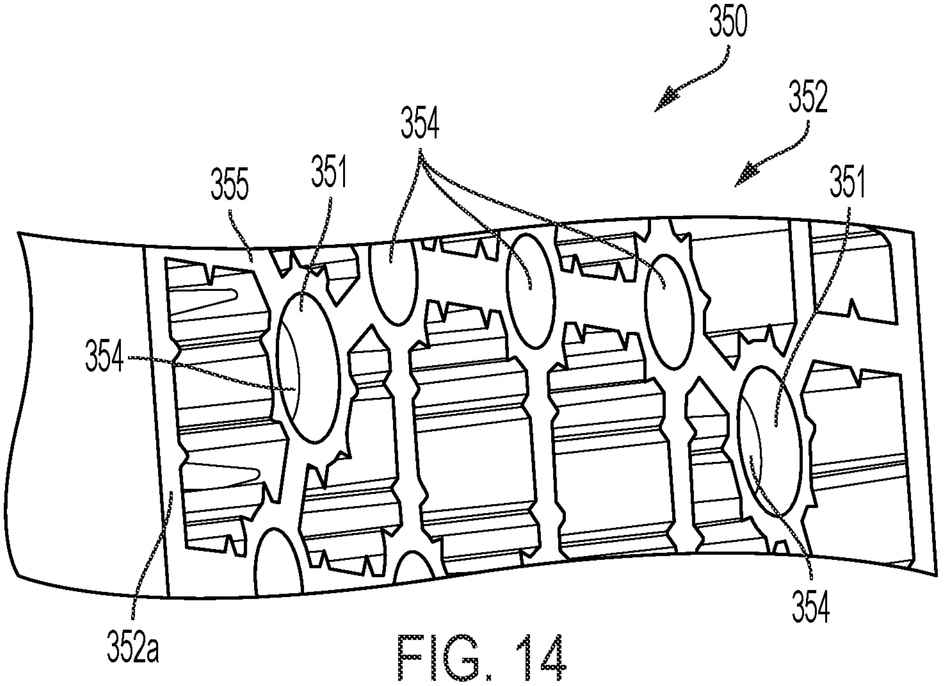
FIG. 14 is a perspective view of the fuel segment of FIG. 12, illustrating recessed openings on a first side of the fuel segment, according to an aspect of the present disclosure.
Figure 15:
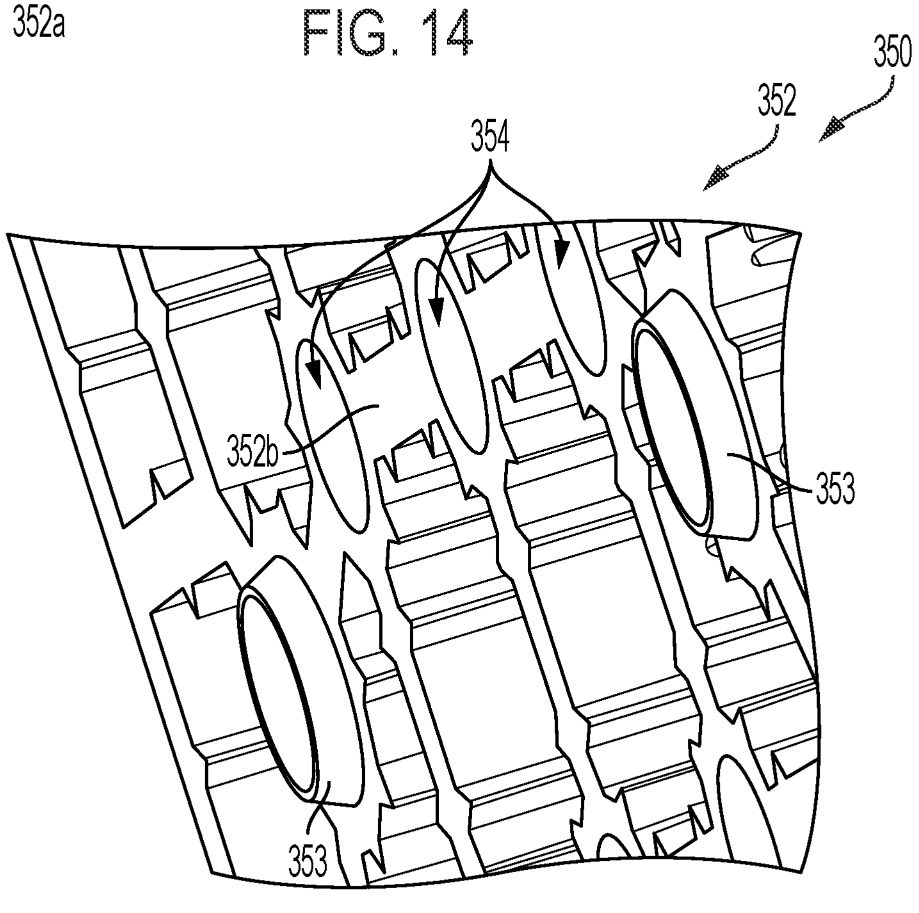
FIG. 15 is another perspective view of the fuel segment of FIG. 12, illustrating protrusions extending from a second side of the fuel segment opposite the first side, according to an aspect of the present disclosure.

Referring primarily to FIGS. 14 and 15, the fuel segment 350 further comprises one or more than one recess opening 351 on a first side 352*a* of the body 352 and one or more than one annular protrusion 353 on a second side 352*b* of the body 352 opposite the first side 352*a*. Each of the recess openings 351 are defined into the body 452 and aligned with one of the tube openings 354. Further, each of the annular protrusions 353 extend from the body 352 and are aligned with one of the tube openings 354. In at least one aspect, the fuel segment 350 comprises only one recess opening 351 and only one annular protrusion 353. In at least one aspect, the fuel segment 350 comprises greater than or equal to four recess openings 351 and less than or equal to twenty five recess openings 351. In at least one aspect, the fuel segment 350 comprises greater than or equal to four annular protrusions 353 and less than or equal to twenty five annular protrusions 353. In at least one aspect, the fuel segment 350 comprises twenty five recess openings 351 and twenty five annular protrusions 353, e.g., one for each of the tube openings 354 on each side 352*a*, 352*b* of the body 352. As such, it should be understood that any number of recess openings 351 and annular protrusions 353 may be defined by the body 352. In any event, when more than one of the fuel segments 350 are stacked together, similar to the configuration shown in FIG. 1, one of the annular protrusions 353 of a first one of the fuel segments 350 is received in one of the recess openings 351 of a second one of the fuel segments 350 to interlock the first and second fuel segments together. Further, the interlocking features, e.g., the one or more than one recess opening 351 and the one or more than one annular protrusion 353 may be employed with any of the fuel segments described herein.

Figure 16:
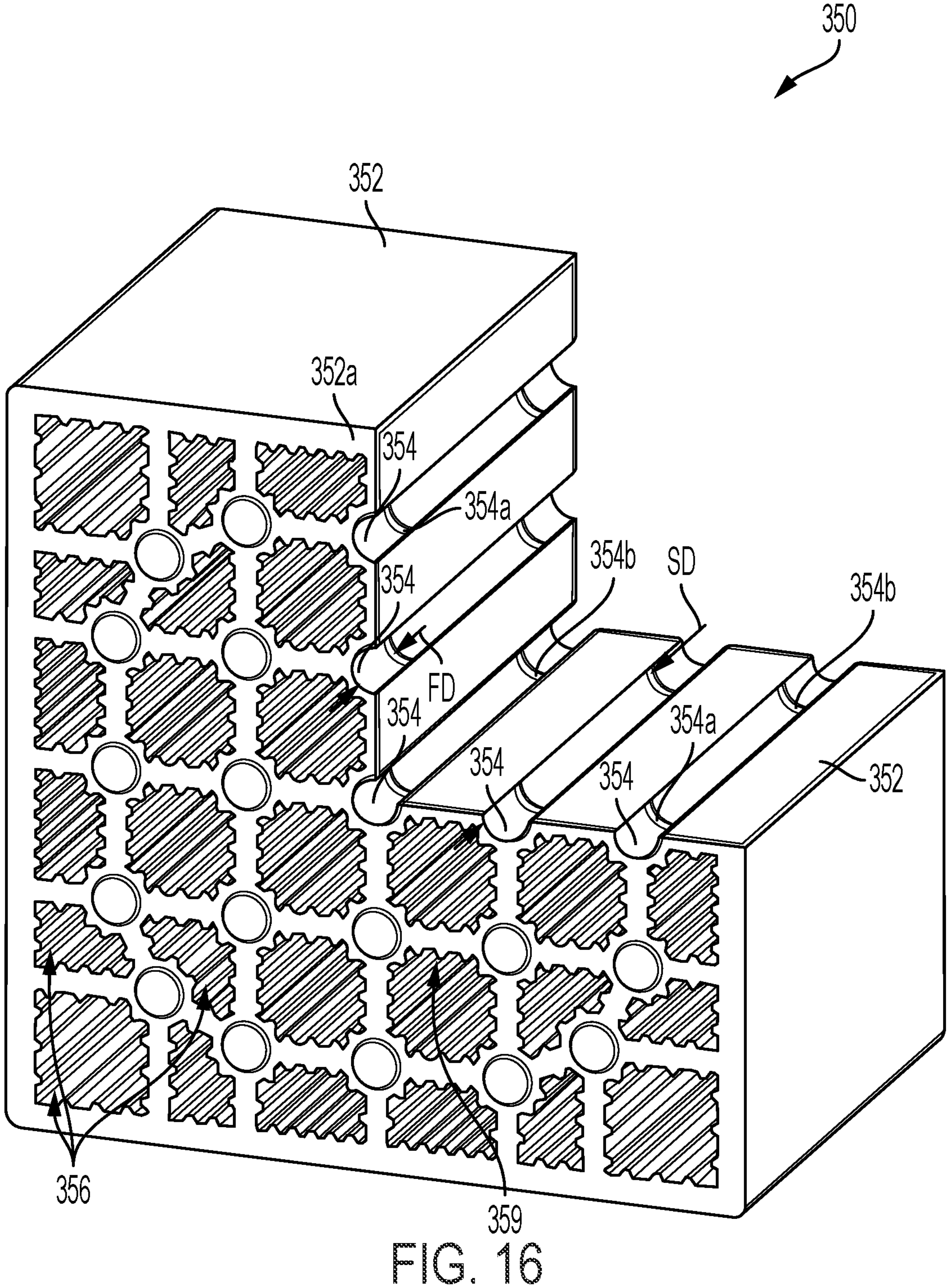
FIG. 16 is perspective view of the fuel segment of FIG. 12, illustrating a portion of the fuel segment removed to show a plurality of annular bulge slots, according to an aspect of the present disclosure.

FIG. 16 illustrates the fuel segment 350 with a portion of the fuel segment 350 cut away to illustrate within several of the tube openings 354, according to an aspect of the present disclosure. In at least one aspect, each tube opening 354 comprises a first bulge slot 354*a* and a second bulge slot 354*b* defined by the body 352. The first bulge slots 354*a* are positioned within the fuel segment 350 a first distance FD from the first side 352*a* and the second bulge slots 354*b* are positioned within the fuel segment a second distance SD from the first side 352*a*. As shown in FIG. 16, the second distance SD is greater than the first distance FD. In at least one aspect, all of the first bulge slots 354*a* reside in a first lateral plane and all of the second bulge slots 354*b* reside in a second lateral plane that is spaced apart from the first lateral plane. In any event, the bulge slots 354*a*, 354*b* are to permit the fuel segment 350 to interlock to the guide tubes 130 and/or the instrumentation tube 135, as discussed in greater detail below.

After at least one of the fuel segments 350 is installed onto the guide tubes 130 and the instrumentation tube 135, as described herein, a tool can be lowered into the guide tube 130, 135 and aligned with the first bulge slots 354*a*. The tool expands the plurality of guide tubes 130, 135 (e.g., plastically deforms) into the bulge slots 354*a*. In at least one aspect, the tool can bulge, e.g., deform, the guide tubes 130, 135 into each of the bulge slots 354*a* at the same time. In other words, all twenty-five guide tubes 130, 135 can be bulged into all twenty five of the first bulge slots 354*a* at one time. The tool can then be repositioned to align with the second bulge slots 354*b* and all twenty five of the plurality of guide tubes 130, 135 can be bulged into all twenty five of the second bulge slots 354*b*. This process can be repeated for any and/or all of the fuel segments 350 stacked together to make up a segmented fuel assembly. The bulge slots 354*a*, 354*b* permit the fuel segment 350 to interlock with the plurality of guide tubes 130, 135 to prevent the fuel segment 350 from moving along the guide tubes 130. Further, one or more than one bulge slot may be employed with any of the fuel segments described herein.

Figure 17:
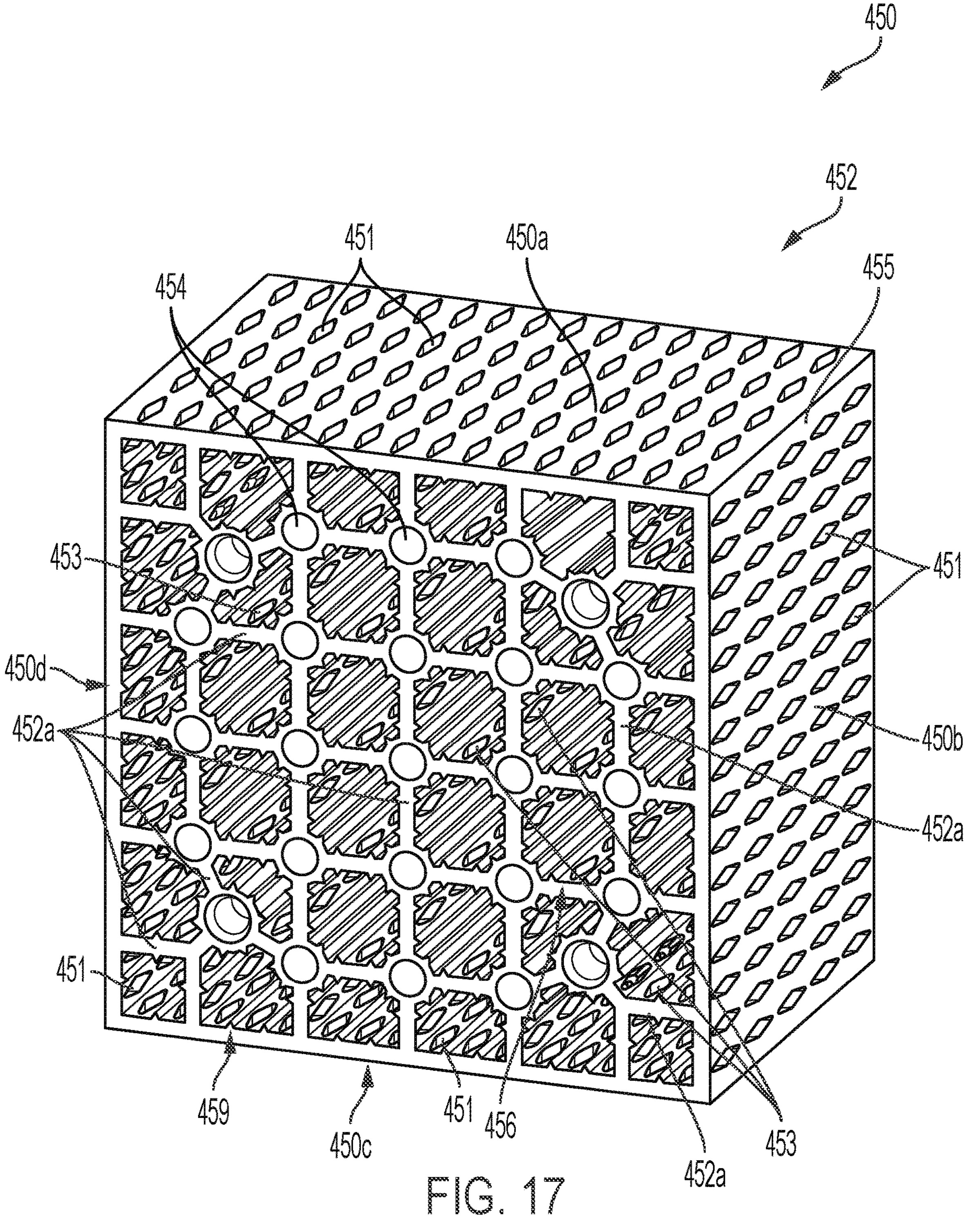
FIG. 17 is a perspective view of a fuel segment including apertures defined by a body of the fuel segment, according to an aspect of the present disclosure.

FIG. 17 illustrates a fuel segment 450 that is similar to the fuel segments 150, 250, 350 except for the differences discussed herein, according to an aspect of the present disclosure. The fuel segment 450 comprises a body 452, a plurality of tube openings 454, and a plurality of coolant flow channels 456. The body 452 comprises an enclosure 455 that encapsulates fission material, as discussed herein. The body 452 comprises a plurality of fins 459 extending into the plurality of coolant flow channels 456. Further, the body 452 defines a plurality of apertures 451 (e.g., lateral coolant flow channel) in each of four side walls 450*a*, 450*b*, 450*c*, 450*d* of the body 452. In at least one aspect, the body 452 defines a plurality of apertures 453 between one or more than one adjacent coolant flow channels 456. As shown in FIG. 17, the apertures 453 are defined through interconnecting walls 452*a* of the body 452. In other words, the plurality of apertures 453 permit reactor coolant to flow between adjacent coolant flow channels 456 during service. In at least one aspect, a plurality of the apertures 451 and a plurality of the apertures 453 are aligned such that passageways are defined through the entire thickness of the fuel segment 450. In such instances, the plurality of apertures 451, 453 permit cross flow of reactor coolant between fuel segments of adjacent segmented fuel assemblies.

Figure 18:
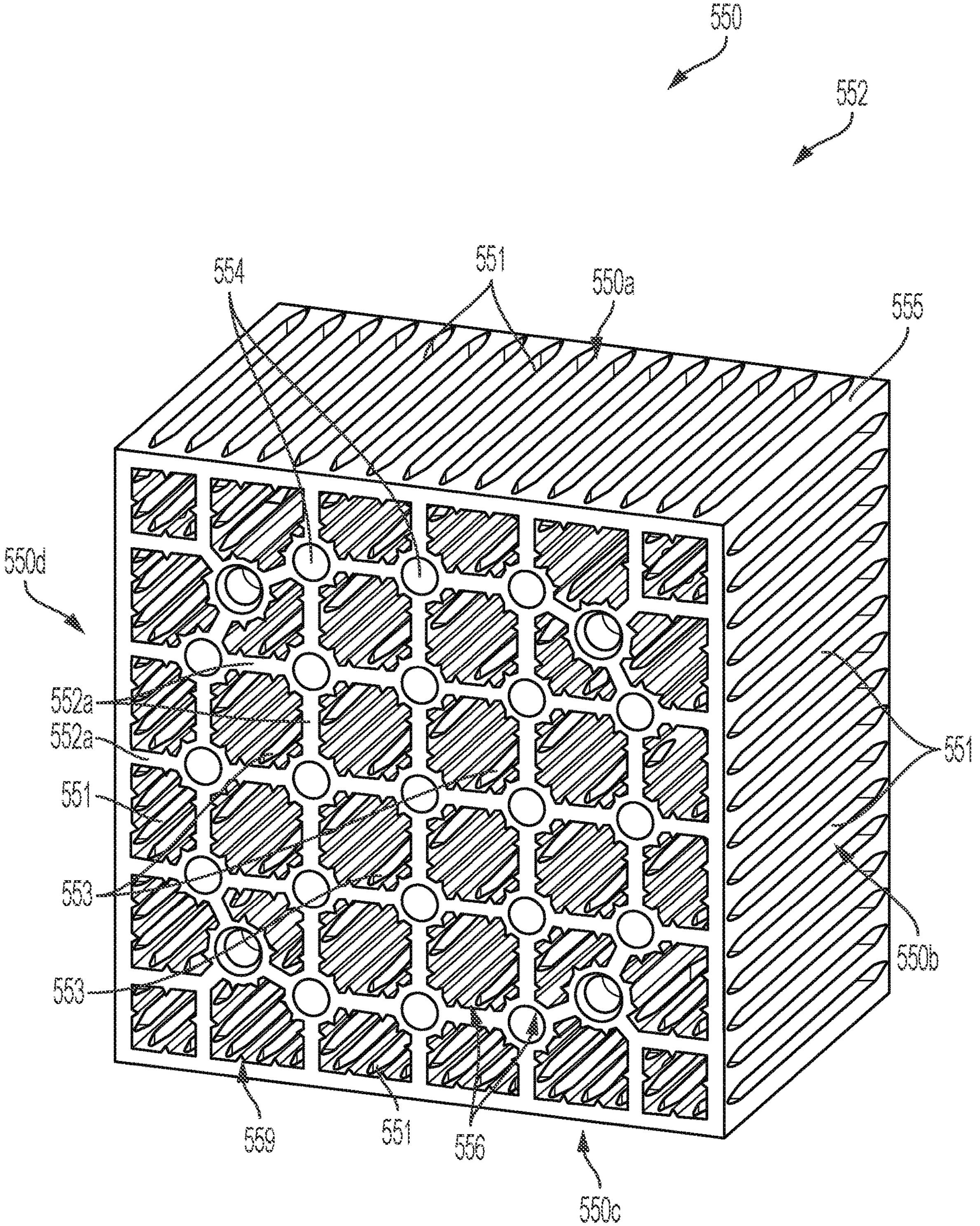
FIG. 18 is a perspective view of a fuel segment including apertures defined by a body of the fuel segment, according to an aspect of the present disclosure.
Figure 19:
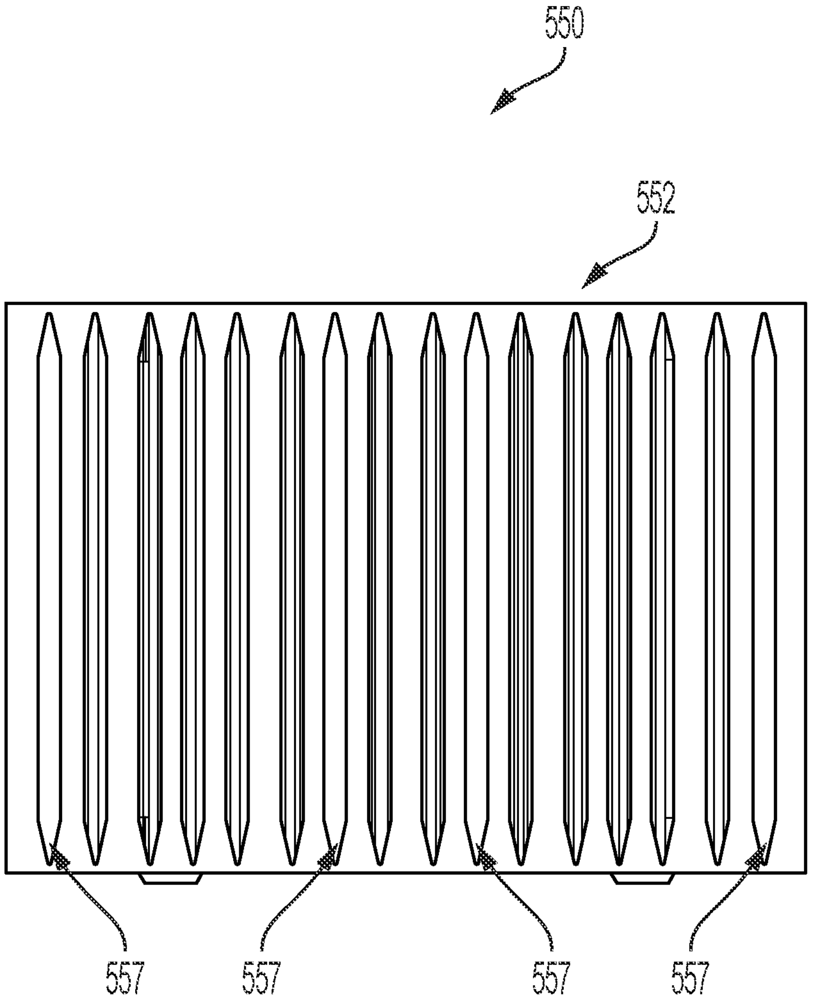
FIG. 19 is a side view of the fuel segment of FIG. 18, illustrating a plurality of passageways extending laterally through the fuel segment, according to an aspect of the present disclosure.

FIG. 18 illustrates a fuel segment 550 that is similar to the fuel segments 150, 250, 350, 450 except for the differences discussed herein. The fuel segment 550 comprises a body 552, a plurality of tube openings 554, a plurality of coolant flow channels 556. The body 552 comprises an enclosure 555 that encapsulates fission material, as discussed herein. The body 552 comprises a plurality of fins 559 extending into the plurality of coolant flow channels 556. Further, the body 552 defines a plurality of apertures 551 in each of four side walls 550*a*, 550*b*, 550*c*, 550*d* of the body 552. In at least one aspect, the body 552 defines a plurality of apertures 553 between the coolant flow channels 556. As shown in FIG. 18, the apertures 553 are defined through interconnecting walls 552*a* of the body 552. In other words, the plurality of apertures 553 permit reactor coolant to flow between adjacent coolant flow channels 556 during service. In at least one aspect, a plurality of the apertures 551 and a plurality of the apertures 553 are aligned such that passageways 557 are defined through the entire thickness of the fuel segment 450, see FIG. 19. In such instances, the passageways 557 permit cross flow of reactor coolant between fuel segments of adjacent segmented fuel assemblies.

Figure 20:
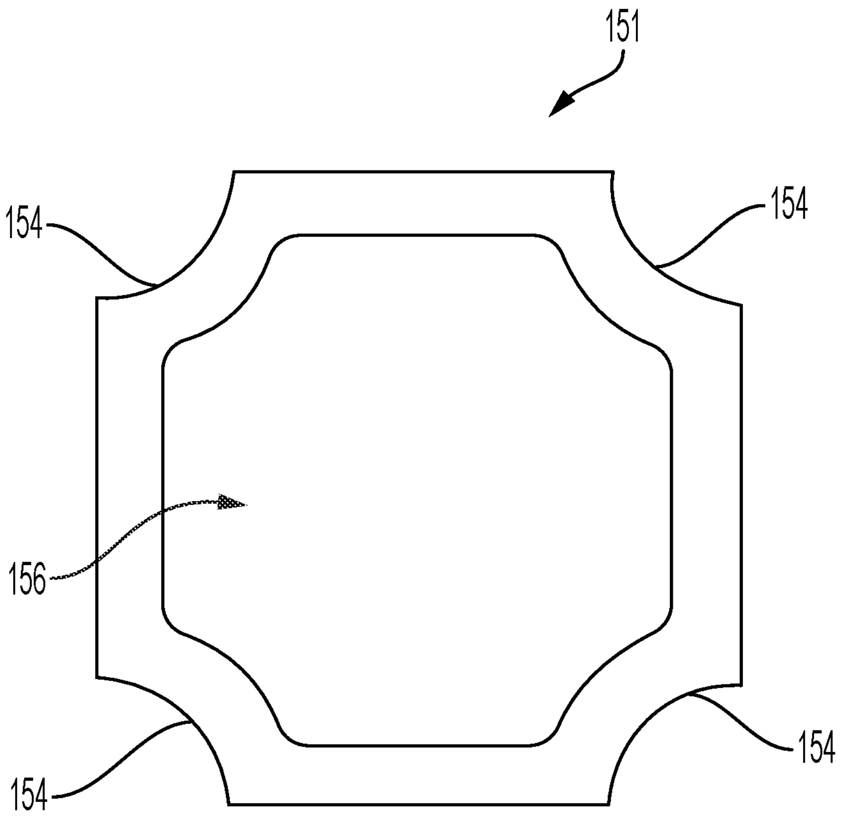
FIG. 20 is a plan view of a unit cell of the fuel segment of FIG. 5, according to an aspect of the present disclosure.

FIG. 20 illustrates a unit cell 151 of the fuel segment 150 of FIG. 5, according to an aspect of the present disclosure. In at least one aspect, the unit cell 151 comprises one of the plurality of flow channels 156 and portions of four of the tube openings 154 adjacent to the one flow channel 156. Specifically, the unit cell 151 comprises one quarter of each adjacent tube opening 154 and one flow channel 156. As shown in FIG. 20, the flow channel 156 is absent structure (e.g., it is empty). In various aspects, in order to minimize the heat flux with any given unit cell, the surface area of the unit cell can be increased. As such, different unit cell geometries having integral inserts within the flow channel of the unit cell are considered, as discussed in greater detail below. In various aspects, the integral inserts are shaped and/or oriented in order to keep the heat flux within the unit cell low by increasing the surface area of the unit cell. Further, in various aspects, geometries and/or orientation of the integral inserts may reduce grid to rod fretting, pellet cladding interactions, and debris induced failures.

Figure 21:
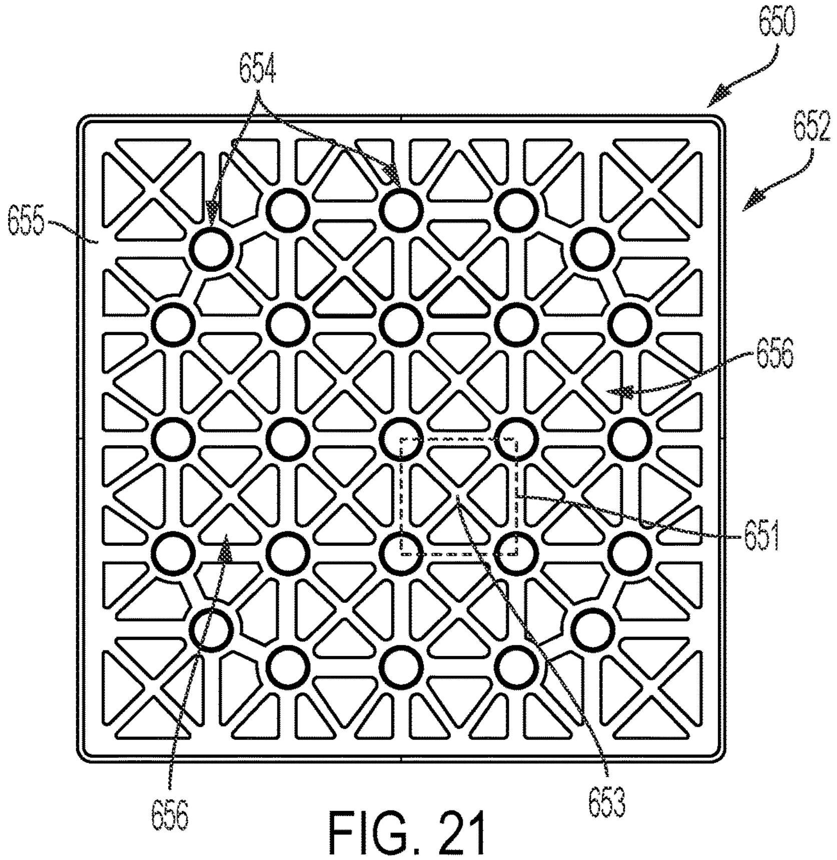
FIG. 21 is a plan view of a fuel segment including a unit cell defining a cross, according to an aspect of the present disclosure.

FIG. 21 illustrates a fuel segment 650 that is similar to the fuel segments 150, 250, 350, 450, 550 except for the differences discussed herein, according to an aspect of the present disclosure. The fuel segment 650 comprises a body 652, a plurality of tube openings 654, and a plurality of coolant flow channels 656. The body 652 comprises an enclosure 655 that encapsulates fission material, as discussed herein.

Figure 22:
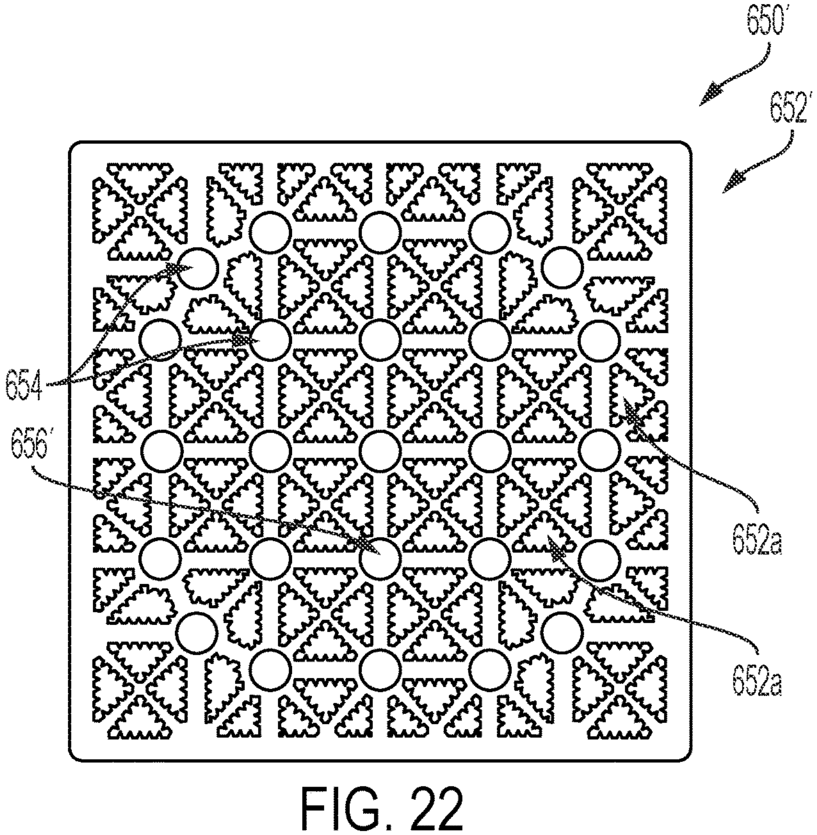
FIG. 22 is a plan view of a fuel segment including a unit cell defining a cross, and fins extending from a body of the fuel segment, according to an aspect of the present disclosure.

FIG. 22 illustrates a fuel segment 650' that is similar to the fuel segment 650 except for the differences discussed herein, according to an aspect of the present disclosure. A body 652' of the fuel segment 650' comprises a plurality of fins 652*a* extending into a plurality of coolant flow channels 656'.

Figure 23:
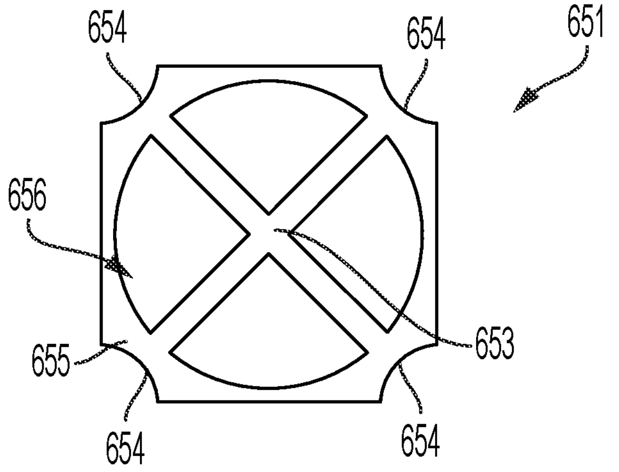
FIG. 23 is a plan view of the unit cell of the fuel segment of FIG. 21, the unit cell having an integral insert defining a cross, according to an aspect of the present disclosure.
Figure 24:
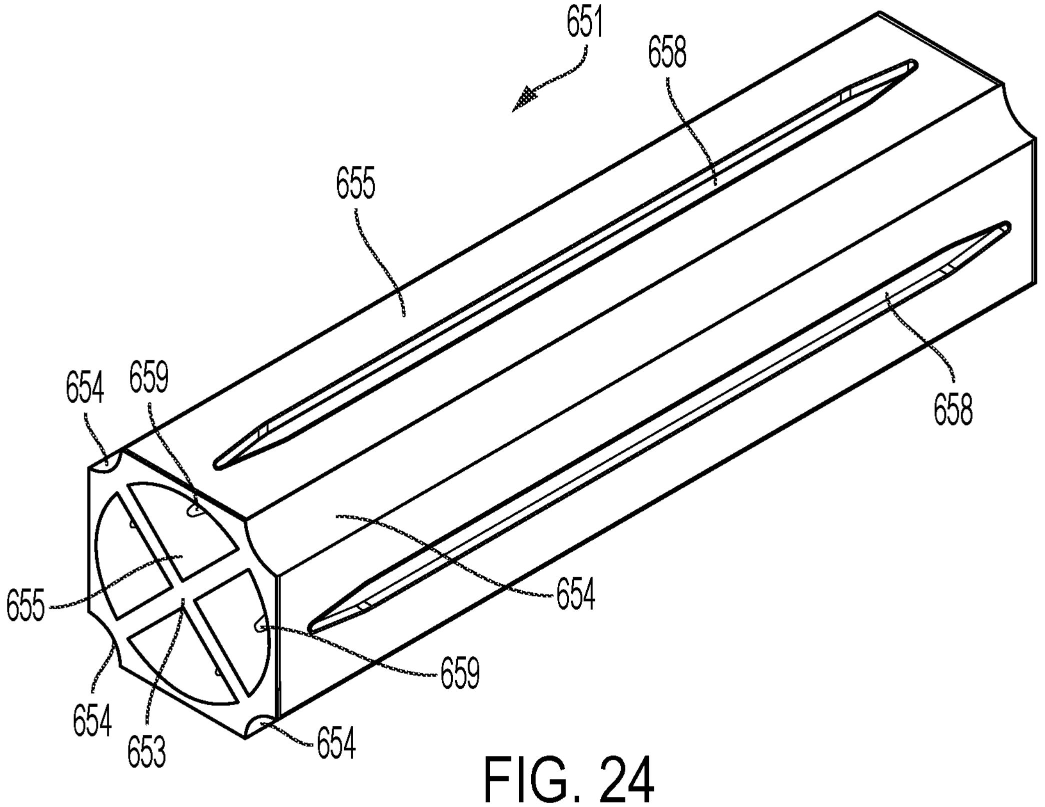
FIG. 24 is a perspective view of the unit cell of FIG. 23, according to an aspect of the present disclosure.

FIGS. 23 and 24 illustrate a unit cell 651 of the fuel segment 650, according to an aspect of the present disclosure. The unit cell 651 comprises an integral insert 653 (e.g., a cross) positioned within the coolant flow channel 656. In at least one aspect, the integral insert is a cross. In at least one aspect, the unit cell 651 is a one-piece, unitary, structure comprising an enclosure 655 that encapsulates fission material. Further, the unit cell 651 comprises a plurality of outer apertures 658 defined through the four outer walls of the unit cell 651 and a plurality of inner apertures 659 defined through the four walls of the integral insert 653.

Figure 25:
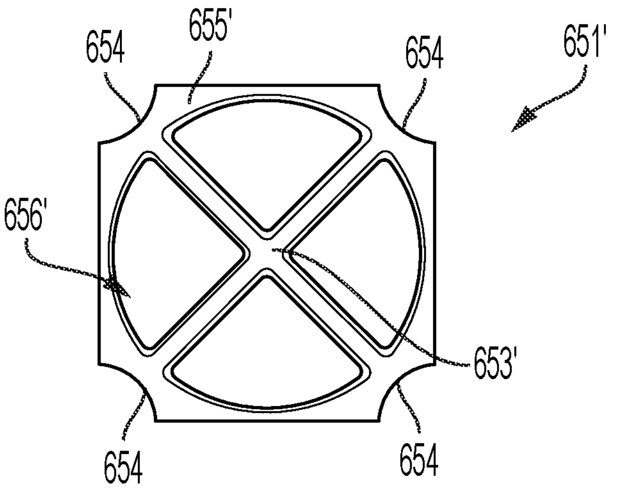
FIG. 25 is a plan view of a unit cell of a fuel segment, the unit cell having an integral insert defining a cross, according to an aspect of the present disclosure.
Figure 26:
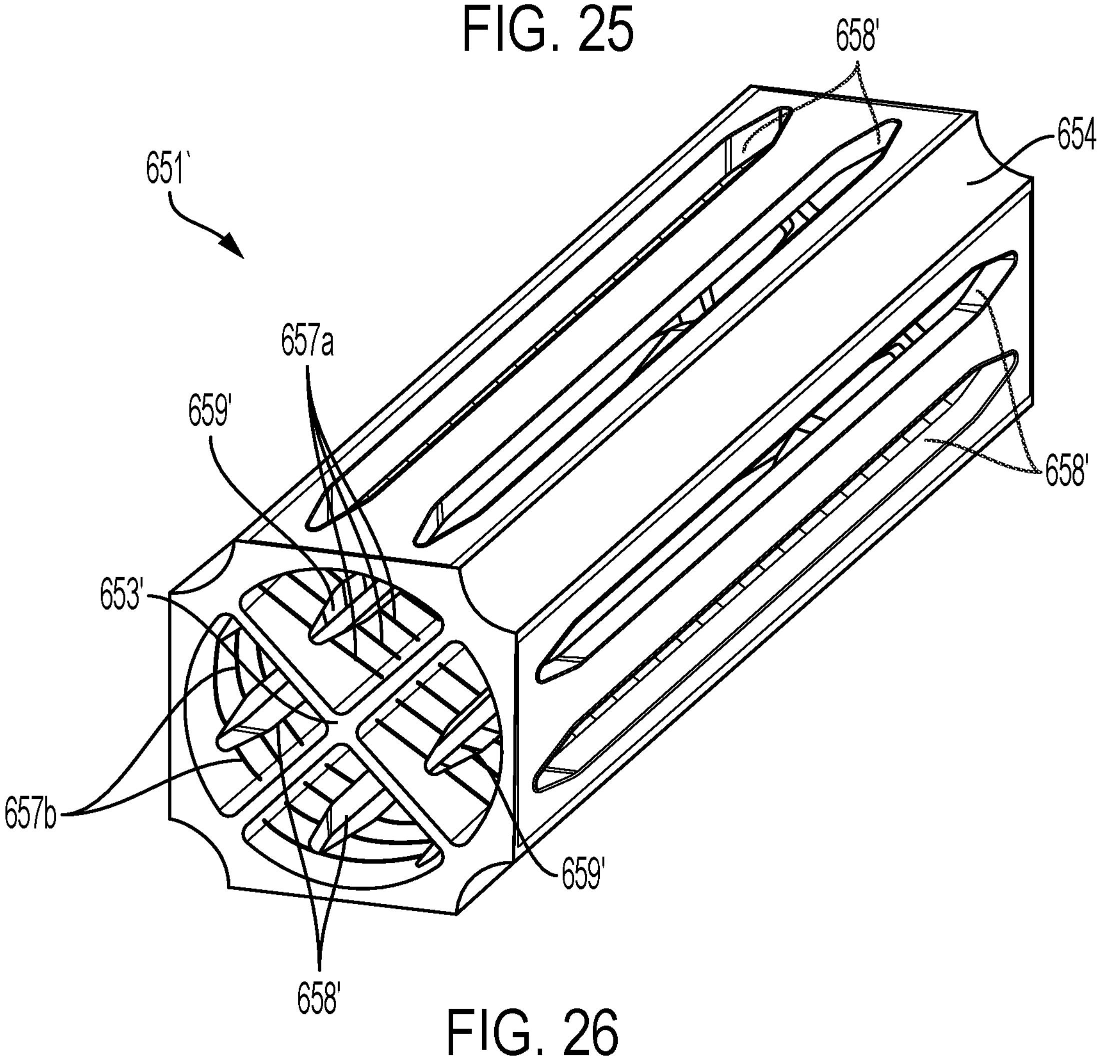
FIG. 26 is a perspective view of the unit cell of FIG. 25, depicting a plurality of grooves defined in the cross of the integral insert, according to an aspect of the present disclosure.

FIGS. 25 and 26 illustrate a unit cell 651' of a fuel segment that is similar to the unit cell 651 of the fuel segment 650 except for the difference discussed herein, according to an aspect of the present disclosure. The unit cell 651' comprises an integral insert 653' (e.g., a cross) positioned within a coolant flow channel 656'. In at least one aspect, the unit cell 651' is a one-piece, unitary, structure comprising an enclosure 655' that encapsulates fission material. Further, the unit cell 651' comprises a plurality of outer apertures 658' defined through the four outer walls of the unit cell 651' and a plurality of inner apertures 659' defined through the four walls of the integral insert 653'. In at least one aspect, there are two outer apertures 658' defined in each outer wall of the unit cell 651'. Referring primarily to FIG. 26, the integral insert 653' further defines a plurality of first grooves 657*a*. In at least one aspect, the plurality of first grooves 657*a* intersect the plurality of inner apertures 659' at an angle. Further, the unit cell 651' further defines a plurality of second grooves 657*b* on the inside diameter of the enclosure 655'. In at least one aspect, the plurality of second grooves 657*b* are oriented orthogonal to the plurality of outer apertures 658'.

Figure 27:
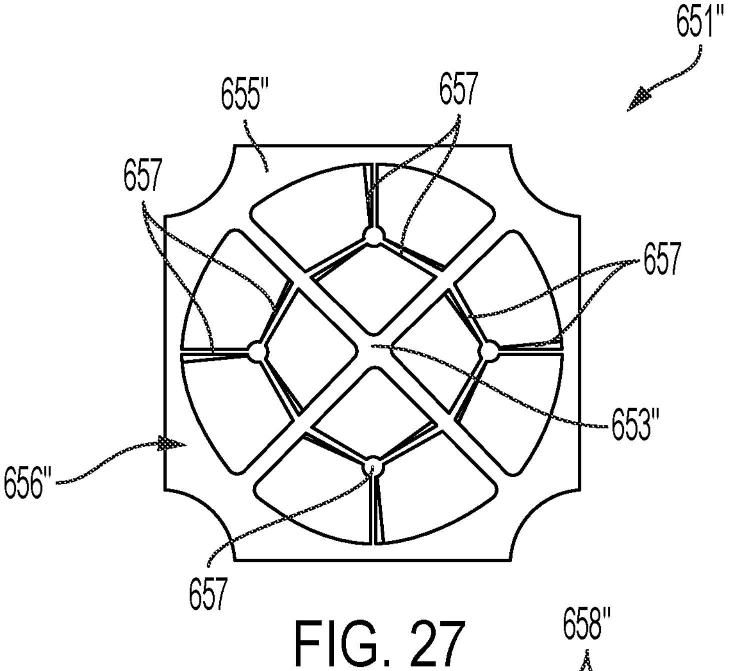
FIG. 27 is a plan view of a unit cell of a fuel segment, the unit cell having an integral insert defining a cross and blades, according to an aspect of the present disclosure.
Figure 28:
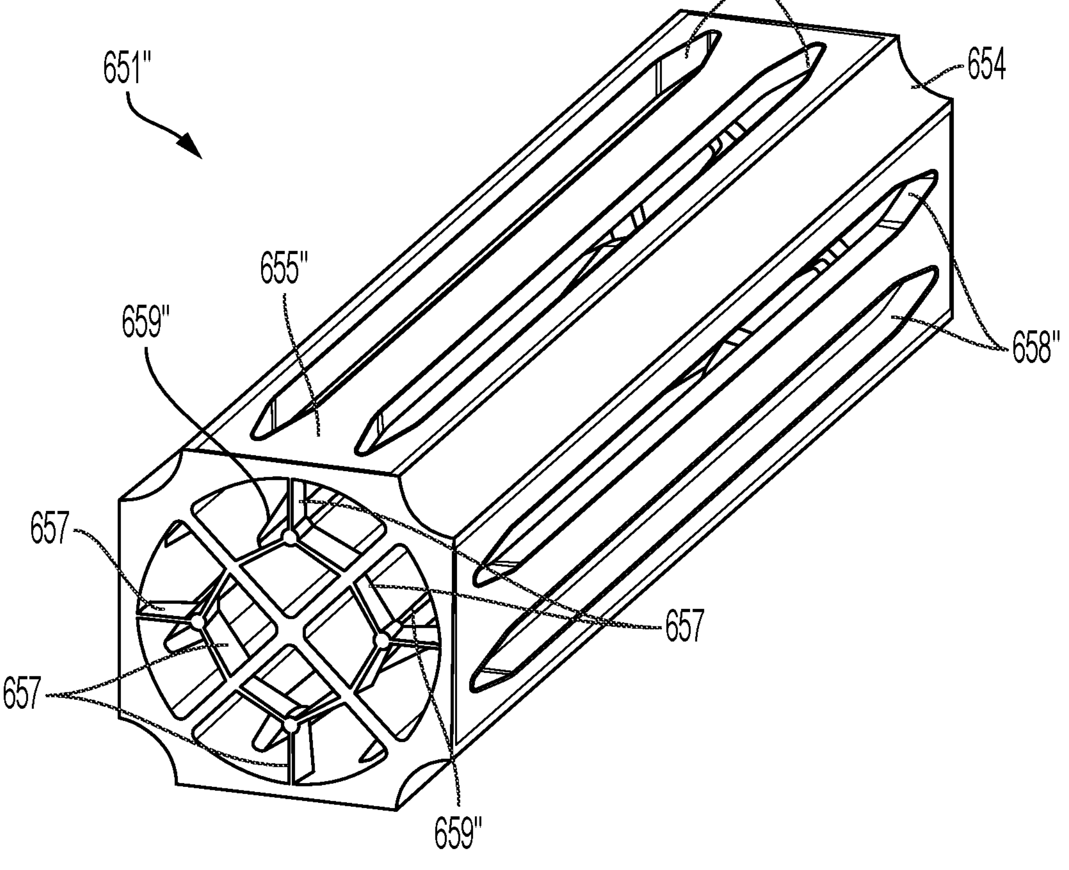
FIG. 28 is a perspective view of the unit cell of FIG. 28, according to an aspect of the present disclosure.

FIGS. 27 and 28 illustrate a unit cell 651" of a fuel segment that is similar to the unit cell 651' except for the difference discussed herein, according to an aspect of the present disclosure. The unit cell 651" comprises an integral insert 653" (e.g., a cross) positioned within a coolant flow channel 656". In at least one aspect, the unit cell 651" is a one-piece, unitary, structure comprising an enclosure 655" that encapsulates fission material. Further, the unit cell 651" comprises a plurality of outer apertures 658" defined through the four outer walls of the unit cell 651" and a plurality of inner apertures 659" defined through the four walls of the integral insert 653". In at least one aspect, there are two outer apertures 658" defined in each outer wall of the unit cell 651". The integral insert 653" further comprises a plurality of blades 657 at one end of the unit cell 651". In at least one aspect, the plurality of blades 657 are positioned intermediate the integral insert 653" and each of the four outer walls of the unit cell 651". In at least one aspect, the plurality of blades 657 only extend along a portion of the length of the unit cell 651". In at least one aspect, the plurality of blades 657 extend along the entire length of the unit cell 651". In at least one aspect, the plurality of blades 657 comprise an enclosure and fission material encapsulated within the enclosure.

Figure 29:
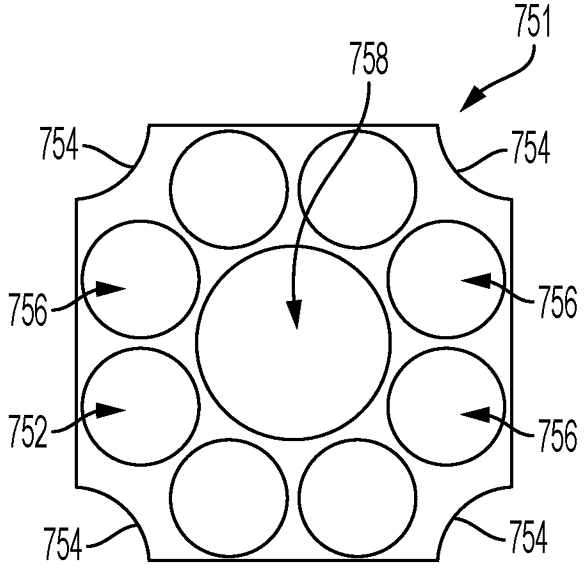
FIG. 29 is a plan view of a unit cell of a fuel segment, the unit cell having an integral insert defining a plurality of openings, according to an aspect of the present disclosure.
Figure 30:
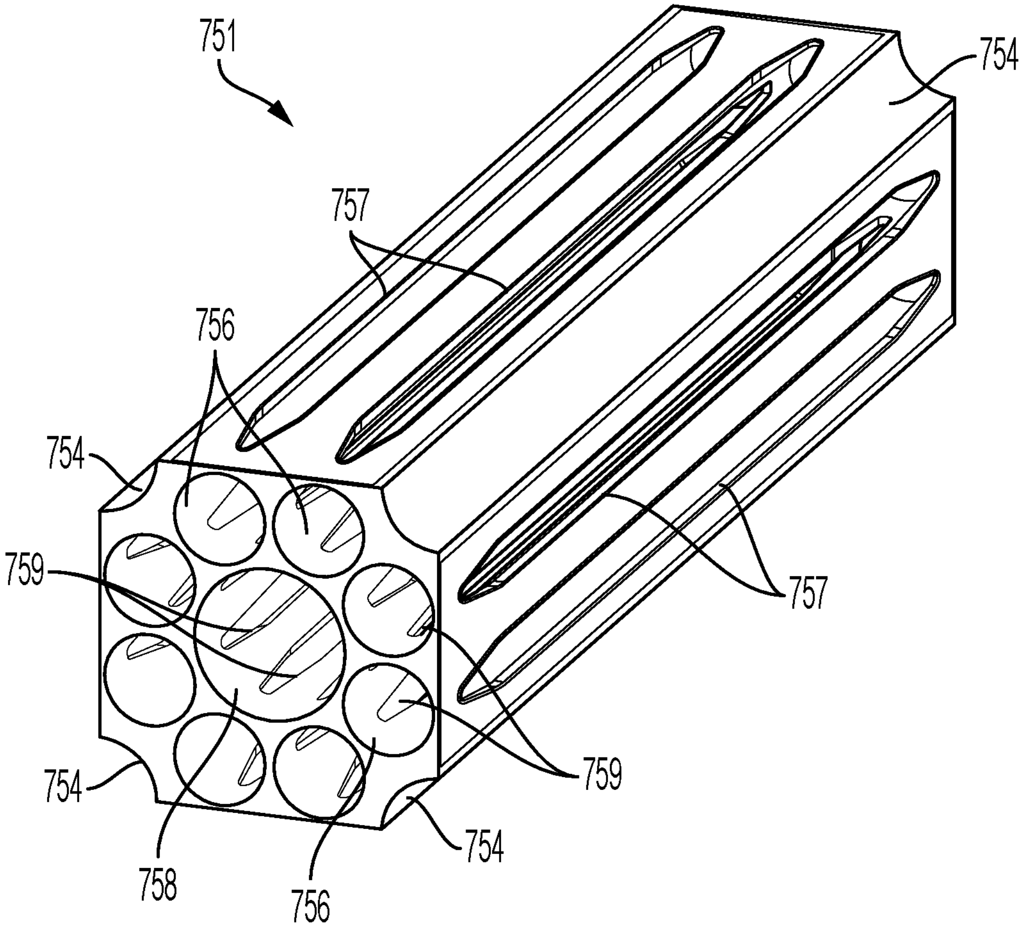
FIG. 30 is a perspective view of the unit cell of FIG. 29, according to an aspect of the present disclosure.

FIGS. 29 and 30 illustrate a unit cell 751 of a fuel segment that is similar to the unit cell 651 except for the difference discussed herein, according to an aspect of the present disclosure. The unit cell 751 is defined between portions of four tube openings 754 similar to the unit cell 651. The unit cell 751 comprises an integral insert 752 defining a plurality of outer openings 756 surrounding an inner opening 758. In at least one aspect, the outer openings 756 are smaller in diameter than the inner opening 758. Further, the unit cell 751 defines a plurality of outer apertures 757 in the four outer walls of the unit cell 751. In at least one aspect, two of the outer apertures 757 are defined into each of the four walls of the unit cell 751. In at least one aspect, the unit cell 751 defines a plurality of inner apertures 759 between the inner opening 758 and the outer openings 756, and between adjacent openings of the outer openings 756. In at least one aspect, the outer openings 756, the inner opening 758, the outer apertures 757, and the inner apertures 759 permit reactor coolant to flow therethrough when the unit cell 751 is in service.

Figure 31:
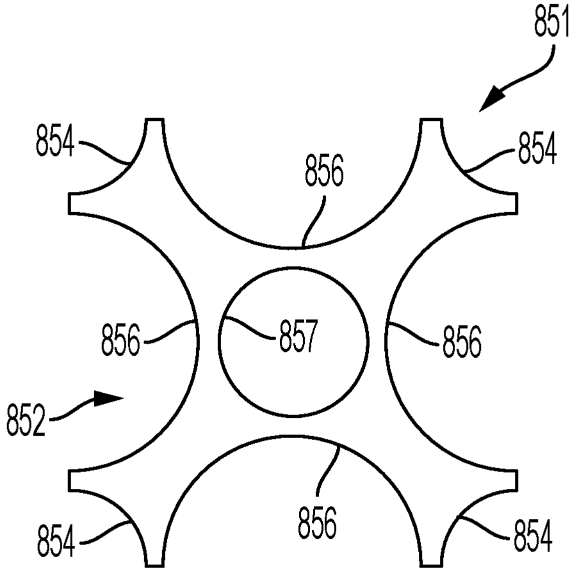
FIG. 31 is a plan view of a unit cell of a fuel segment, the unit cell having an integral insert defining a plurality of outer openings surrounding an inner opening, according to an aspect of the present disclosure.
Figure 32:
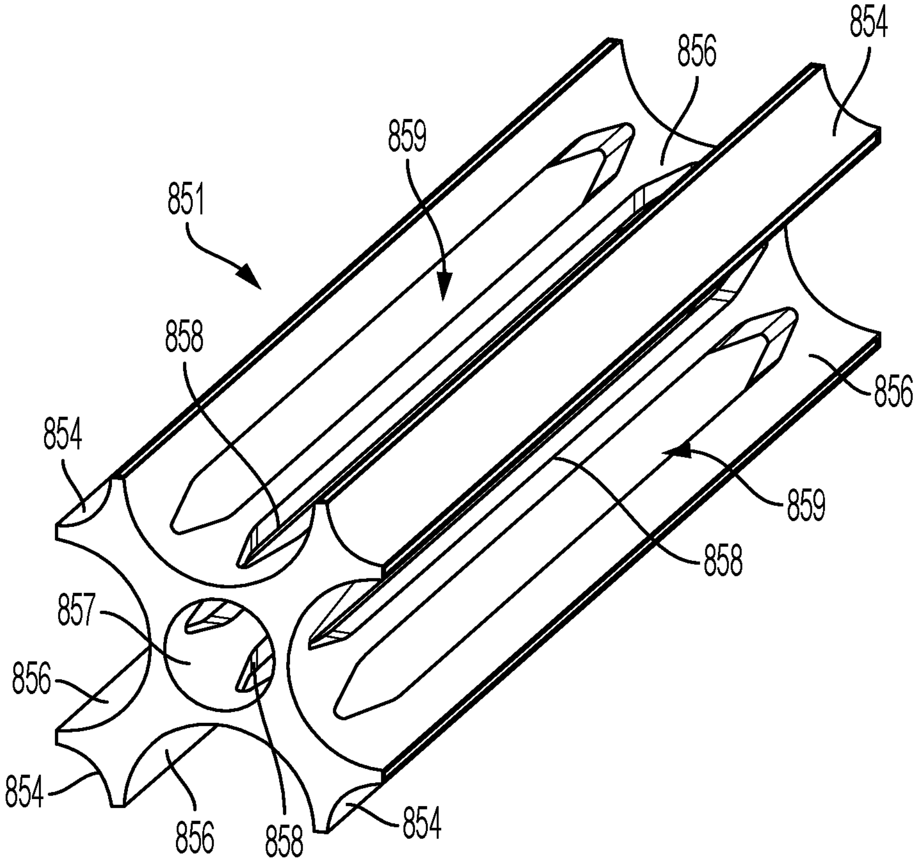
FIG. 32 is a perspective view of the unit cell of FIG. 31, according to an aspect of the present disclosure.

FIGS. 31 and 32 illustrate a unit cell 851 of a fuel segment that is similar to the unit cell 651 and the unit cell 751, except for the difference discussed herein, according to an aspect of the present disclosure. The unit cell 851 is defined between portions of four tube openings 854 similar to the unit cell 651 and the unit cell 751. The unit cell 851 comprises an integral insert 852 defining a plurality of outer openings 856 surrounding an inner opening 857. In at least one aspect, the outer openings 856 are greater in diameter than the inner opening 857. Further, the unit cell 851 defines a plurality of first apertures 858 between the inner opening 857 and the outer openings 856. In at least one aspect, the unit cell 851 defines three of the first apertures 858. Further, the unit cell 851 defines a plurality of second apertures 859 between adjacent outer openings 856. In at least one aspect, the unit cell 851 defines three of the second apertures 859. Further, in at least one aspect, the outer openings 856, the inner opening 857, the first apertures 858, and the second apertures 859 permit reactor coolant to flow therethrough when the unit cell 851 is in service.

Various aspects of the present disclosure include, but are not limited to, the aspects listed in the following numbered clauses.

Clause 1—A segmented fuel assembly for use in a nuclear reactor, the segmented fuel assembly comprises a lower nozzle, an upper nozzle, a plurality of guide tubes positioned intermediate the lower nozzle and the upper nozzle, and a plurality of fuel segments positioned intermediate the upper nozzle and the lower nozzle. The plurality of guide tubes are arranged in a first array. Each guide tube defines a longitudinal axis. Each fuel segment comprises a body defining a plurality of coolant flow channels and a plurality of guide tube openings. The guide tube openings are arranged in a second array corresponding to the first array. The guide tubes are positioned in the guide tube openings.

Clause 2—The segmented fuel assembly of Clause 1, wherein the body comprises an enclosure and fission material encapsulated within the enclosure.

Clause 3—The segmented fuel assembly of Clause 1 or 2, wherein the body is 3D printed.

Clause 4—The segmented fuel assembly of Clauses 1, 2, or 3, wherein the plurality of fuel segments are arranged in a stacked configuration intermediate the lower nozzle and the upper nozzle.

Clause 5—The segmented fuel assembly of Clauses 1, 2, 3, or 4, wherein the plurality of fuel segments comprise a first fuel segment and a second fuel segment, wherein the first fuel segment comprises a protrusion and the second fuel segment comprises an opening to receive the protrusion, and wherein the protrusion and opening are configured to interlock the first fuel segment and the second fuel segment.

Clause 6—The segmented fuel assembly of Clauses 1, 2, 3, 4, or 5, wherein the coolant flow channels are defined in a third array, and wherein the second array of the guide tube openings is disposed within the third array of the coolant flow channels.

Clause 7—The segmented fuel assembly of Clauses 1, 2, 3, 4, 5, or 6, wherein the body further comprises a plurality of fins extending laterally into the coolant flow channels.

Clause 8—The segmented fuel assembly of Clauses 1, 2, 3, 4, 5, 6, or 7, wherein the plurality of coolant flow channels comprise first coolant flow channels extend longitudinally, wherein each fuel segment further comprises a plurality of second coolant flow channels defined by the body, and wherein the second coolant flow channels extending laterally.

Clause 9—The segmented fuel assembly of Clauses 1, 2, 3, 4, 5, 6, 7, or 8, wherein a first guide tube opening of the plurality of guide tube openings comprises an annular bulge slot defined by the body of at least one of the fuel segments.

Clause 10—The segmented fuel assembly of Clause 9, wherein a portion of a first guide tube of the plurality of guide tubes is deformed into the annular bulge slot to interlock the at least one of the fuel segment to the first guide tube.

Clause 11-A fuel segment for a fuel assembly comprising an upper nozzle, a lower nozzle, and a plurality of guide tubes intermediate the upper nozzle and the lower nozzle. The fuel segment comprises a body comprising an enclosure and a fission material encapsulated within the enclosure. The body defines a plurality of coolant flow channels and a plurality of guide tube openings. The guide tube openings are to receive the guide tubes of the fuel assembly.

Clause 12—The fuel segment of Clause 11, wherein the body is 3D printed.

Clause 13—The fuel segment of Clause 11 or 12, wherein the guide tubes of the fuel assembly define a first array, wherein the guide tube openings of the fuel segment define a second array that corresponds to the first array.

Clause 14—The fuel segment of Clause 13, wherein the coolant flow channels defined in a third array, and wherein the second array of the guide tube openings is disposed within the third array of the coolant flow channels.

Clause 15—The fuel segment of Clauses 11, 12, 13, or 14, wherein the body further defines a plurality of fins extending into the coolant flow channels.

Clause 16—The fuel segment of Clauses 11, 12, 13, 14, or 15, wherein the plurality of coolant flow channels comprise first coolant flow channels extend longitudinally, wherein the fuel segment further comprises a plurality of second coolant flow channels defined by the body, and wherein the second coolant flow channels extending laterally.

Clause 17—The fuel segment of Clauses 11, 12, 13, 14, 15, or 16, wherein a first guide tube opening of the plurality of guide tube openings comprises an annular bulge slot defined by the body.

Clause 18—The fuel segment of Clause 17, wherein a portion of a first guide tube of the plurality of guide tubes is deformed into the annular bulge slot to interlock the fuel segment to the first guide tube.

Clause 19—The fuel segment of Clauses 11, 12, 13, 14, 15, 16, 17, or 18, wherein the body further defines an integral insert positioned within at least one of the plurality of coolant flow channels.

Clause 20—The fuel segment of Clause 19, wherein the integral insert is a cross.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the disclosed disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed disclosure. Accordingly, it will be recognized by persons having ordinary skill in the art that various substitutions, modifications or combinations of any of the exemplary aspects may be made without departing from the scope of the disclosure. In addition, persons skilled in the art will recognize, or be able to ascertain using no more than routine experimentation, many equivalents to the various aspects of the disclosure described herein upon review of this specification. Thus, the disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A segmented fuel assembly for use in a nuclear reactor, comprising:

- a lower nozzle;
- an upper nozzle;
- a plurality of guide tubes positioned intermediate the lower nozzle and the upper nozzle, wherein the plurality of guide tubes are arranged in a first array, and wherein each guide tube defines a longitudinal axis; and
- a plurality of fuel segments positioned intermediate the upper nozzle and the lower nozzle, wherein each fuel segment comprises:
  - a body defining:
    - a plurality of coolant flow channels; and
    - a plurality of guide tube openings, wherein the guide tube openings are arranged in a second array corresponding to the first array, and wherein the guide tubes are positioned in the guide tube openings, wherein the plurality of coolant flow channels comprise first coolant flow channels extending longitudinally, wherein each fuel segment further comprises a plurality of second coolant flow channels defined by the body, and wherein the second coolant flow channels extend laterally.

2. The segmented fuel assembly of claim 1, wherein the body comprises an enclosure and fission material encapsulated within the enclosure.

3. The segmented fuel assembly of claim 1, wherein the body is 3D printed.

4. The segmented fuel assembly of claim 1, wherein the plurality of fuel segments are arranged in a stacked configuration intermediate the lower nozzle and the upper nozzle.

5. The segmented fuel assembly of claim 1, wherein the plurality of fuel segments comprise a first fuel segment and a second fuel segment, wherein the first fuel segment comprises a protrusion and the second fuel segment comprises an opening to receive the protrusion, and wherein the protrusion and opening are configured to interlock the first fuel segment and the second fuel segment.

6. The segmented fuel assembly of claim 1, wherein the coolant flow channels are defined in a third array, and wherein the second array of the guide tube openings is disposed within the third array of the coolant flow channels.

7. The segmented fuel assembly of claim 1, wherein the body further comprises a plurality of fins extending laterally into the coolant flow channels.

8. The segmented fuel assembly of claim 1, wherein a first guide tube opening of the plurality of guide tube openings comprises an annular bulge slot defined by the body of at least one of the fuel segments.

9. The segmented fuel assembly of claim 8, wherein a portion of a first guide tube of the plurality of guide tubes is deformed into the annular bulge slot to interlock the at least one of the fuel segment to the first guide tube.

10. A fuel segment for a fuel assembly comprising an upper nozzle, a lower nozzle, and a plurality of guide tubes intermediate the upper nozzle and the lower nozzle, wherein the fuel segment comprises:

- a body comprising an enclosure and a fission material encapsulated within the enclosure, wherein the body defines:
  - a plurality of coolant flow channels; and
  - a plurality of guide tube openings, wherein the guide tube openings are to receive the guide tubes of the fuel assembly, wherein the plurality of coolant flow channels comprise first coolant flow channels extending longitudinally, wherein the fuel segment further comprises a plurality of second coolant flow channels defined by the body, and wherein the second coolant flow channels extend laterally.

11. The fuel segment of claim 10, wherein the body is 3D printed.

12. The fuel segment of claim 10, wherein the guide tubes of the fuel assembly define a first array, wherein the guide tube openings of the fuel segment define a second array that corresponds to the first array.

13. The fuel segment of claim 12, wherein the coolant flow channels are defined in a third array, and wherein the second array of the guide tube openings is disposed within the third array of the coolant flow channels.

14. The fuel segment of claim 10, wherein the body further defines a plurality of fins extending into the coolant flow channels.

15. The fuel segment of claim 10, wherein a first guide tube opening of the plurality of guide tube openings comprises an annular bulge slot defined by the body.

16. The fuel segment of claim 15, wherein a portion of a first guide tube of the plurality of guide tubes is deformed into the annular bulge slot to interlock the fuel segment to the first guide tube.

17. The fuel segment of claim 10, wherein the body further defines an integral insert positioned within at least one of the plurality of coolant flow channels.

18. The fuel segment of claim 17, wherein the integral insert is a cross.

19. A fuel segment for a fuel assembly comprising an upper nozzle, a lower nozzle, and a plurality of guide tubes intermediate the upper nozzle and the lower nozzle, wherein the fuel segment comprises:

a body comprising an enclosure and a fission material encapsulated within the enclosure, wherein the body defines:

a plurality of coolant flow channels;

a plurality of guide tube openings, wherein the guide tube openings are to receive the guide tubes of the fuel assembly; and an integral insert positioned within at least one of the plurality of coolant flow channels.

20. The fuel segment of claim 19, wherein the integral insert is a cross.

21. The fuel segment of claim 19, wherein the body is 3D printed.

* * * * *